United States Patent
Itoh et al.

(10) Patent No.: US 10,597,237 B2
(45) Date of Patent: Mar. 24, 2020

(54) LIFTING AND LOWERING APPARATUS

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Koji Takahashi, Hyogo (JP)

(73) Assignee: ITOH DENKI CO., LTD. (JP)

( * ) Notice: Subject to any disclaimer, the term of this patent is extended or adjusted under 35 U.S.C. 154(b) by 0 days.

(21) Appl. No.: 16/146,497

(22) Filed: Sep. 28, 2018

(65) Prior Publication Data

US 2019/0127153 A1   May 2, 2019

(30) Foreign Application Priority Data

Oct. 31, 2017   (JP) ................. 2017-210467

(51) Int. Cl.
  *B65G 1/16*    (2006.01)
  *B65G 1/00*    (2006.01)
  (Continued)

(52) U.S. Cl.
  CPC ........... *B65G 47/643* (2013.01); *B65G 13/00* (2013.01); *B65G 2201/0285* (2013.01)

(58) Field of Classification Search
  None
  See application file for complete search history.

(56) References Cited

U.S. PATENT DOCUMENTS

| 4,084,660 | A  | 4/1978 | Anderson |
| 6,394,257 | B1 | 5/2002 | Wheeler |

(Continued)

FOREIGN PATENT DOCUMENTS

| EP | 3141501 A1 | 3/2017 |
| JP | 2006-016203 A | 1/2006 |
| WO | 02/18244 A1 | 3/2002 |

OTHER PUBLICATIONS

Search Report dated Mar. 18, 2019 in Application No. GB1815857.6.

*Primary Examiner* — Kavel Singh
(74) *Attorney, Agent, or Firm* — Wood, Phillips, Katz, Clark & Mortimer

(57) ABSTRACT

The lifting and lowering apparatus includes a plurality of shelf members 6 and 7 and a lifting and lowering mechanism 8. The shelf members 6 and 7 respectively include placing tables A and B positioned on different heights, and each placing table is provided with a conveying unit 10. The shelf members 6 and 7 are lifted and lowered by the lifting and lowering mechanism 8, whereby the placing table A (B) of the shelf member 6 (7) which is one of the shelf members 6 and 7 is adjusted to be on the same height as the placing table B (A) of the other shelf member 7 (6), and with this state, an object is transferred from the placing table of one of the shelf members to the placing table of the other shelf member. The shelf members 6 and 7 are again lifted and lowered to adjust the placing table B (A) of the other shelf member 7 (6) to be on the same height as the placing table A (B) which belongs to the shelf member 6 (7) and which is positioned on a different height, returns the object to the shelf member 6 (7), and transfers the object to the placing table A (B) which is positioned on a different height from the previous placing table A (B).

19 Claims, 20 Drawing Sheets

(51) Int. Cl.
*B65G 47/52* (2006.01)
*B65G 47/64* (2006.01)
*B65G 13/00* (2006.01)

(56) References Cited

U.S. PATENT DOCUMENTS

| | | | |
|---|---|---|---|
| 9,266,675 B2* | 2/2016 | Yamashita | B65G 1/0492 |
| 9,555,967 B2* | 1/2017 | Stevens | B65G 1/04 |
| 9,919,878 B2* | 3/2018 | Dong | B65G 49/06 |
| 2009/0288931 A1 | 11/2009 | Oshima | |
| 2018/0037412 A1* | 2/2018 | Lynch | B65G 1/00 |

* cited by examiner

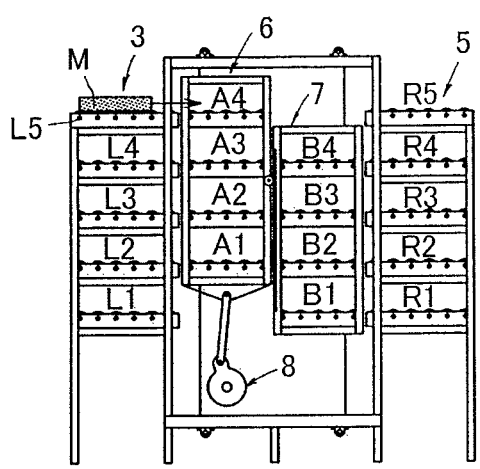
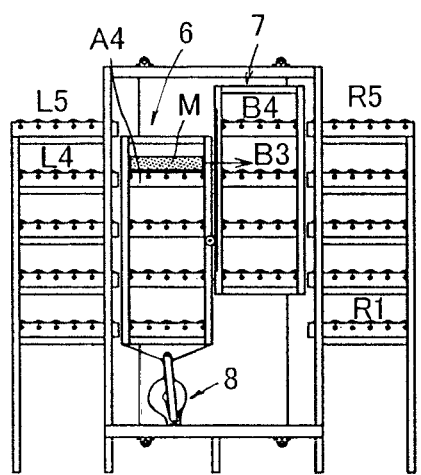
FIG. 5A      FIG. 5B
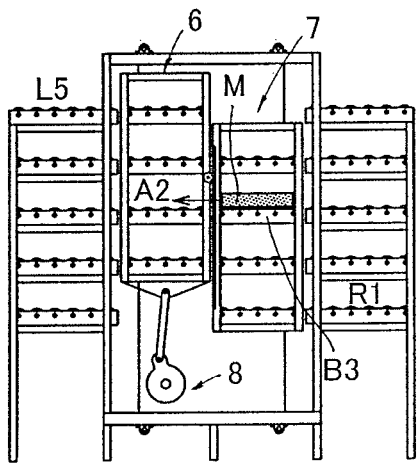
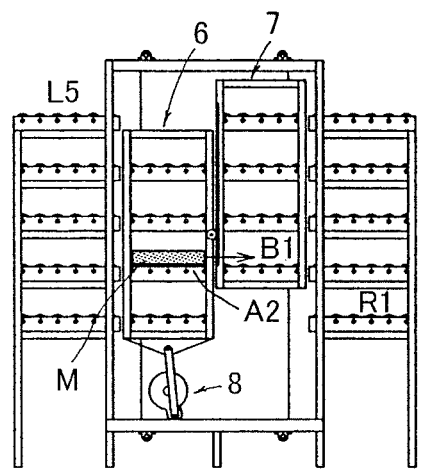
FIG. 5C      FIG. 5D
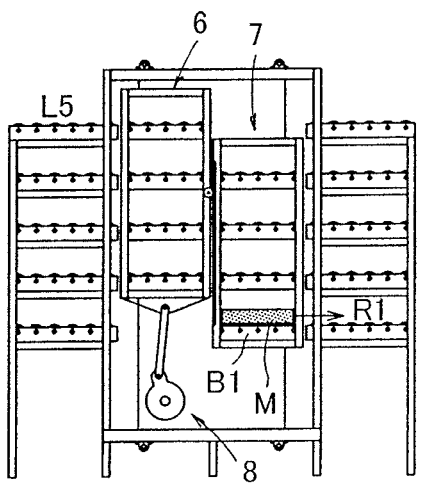
FIG. 5E

LIFTING AND LOWERING APPARATUS

TECHNICAL FIELD

The present invention relates to a lifting and lowering apparatus that moves an object in a vertical direction. The lifting and lowering apparatus according to the present invention is disposed in, for example, a three-dimensional conveyor line to be used to deliver an object between upper and lower conveyors or used for three-dimensional sorting.

BACKGROUND ART

Postal service companies or home delivery companies sort objects such as parcels or packages which have been picked up, according to their destinations. For example, packages which have been picked up are gathered at a specified sorting place, sorted there according to their destinations, and loaded onto trucks, for example. In the sorting place, conveyor lines run in all directions, and packages which have been picked up are gathered by destinations. The conveyor lines in the sorting place include a main conveyance path which splits into a plurality of sub-conveyance paths (child conveyance paths), each of which also splits into a plurality of sub-conveyance paths (grandchild conveyance paths) and great grandchild conveyance paths.

Nowadays, picked-up packages are sorted in a more detailed manner, which may cause the conveyor lines to be more complicated. Therefore, the conveyor lines are three-dimensionally assembled such that a horizontal conveyance path is provided over or below another horizontal conveyance path and packages are delivered between the upper and lower horizontal conveyance paths. Lifting and lowering apparatuses used for such purpose include, for example, an apparatus that lifts and lowers a lifting and lowering table with a pantograph mechanism. Patent Document 1 discloses a configuration for conveying an object by moving up and down a frame-shaped carriage, which is connected to a wire rope suspended around a pulley provided with a driving motor, in the height direction.

PATENT DOCUMENTS

Patent Document 1: JP 2006-16203 A

SUMMARY OF INVENTION

Technical Problem

The conventional lifting and lowering apparatus is considered to be an apparatus including a lower station, an upper station, and a single lifting and lowering table moving back and forth between the stations. Therefore, the conventional lifting and lowering apparatus has a drawback of low conveyance efficiency. Specifically, to move an object from a lower conveyor to an upper conveyor, the conventional lifting and lowering apparatus brings the object from the lower conveyor to the lower station of the lifting and lowering apparatus. Then, the lifting and lowering apparatus lifts, for example, a lifting and lowering table to transfer the object to the upper station. Thereafter, the lifting and lowering apparatus moves the object to the upper conveyor from the upper station.

Therefore, when the lifting and lowering table is at the upper station of the lifting and lowering apparatus, the lifting and lowering table is absent from the lower station, and thus, the lifting and lowering apparatus cannot receive an object. Hence, in the conventional lifting and lowering apparatus, an object has to wait in front of the lifting and lowering apparatus until arrival of the lifting and lowering table.

In view of the problems of the conventional apparatus, the present invention aims to provide a lifting and lowering apparatus having high conveyance efficiency.

Solution to Problem

An aspect for solving the foregoing problem provides a lifting and lowering apparatus including: a first shelf member; a second shelf member disposed adjacent to the first shelf member; and a lifting and lowering mechanism that lifts and lowers at least one of the first and the second shelf members, the first shelf member including a plurality of first placing tables having a different height, the second shelf member including a plurality of second placing tables having a different height, each of the first and the second shelf members including a conveying unit that conveys an object in both a normal direction and a reverse direction, wherein the lifting and lowering apparatus is capable of executing an outbound operation that adjusts a height of one of the first placing tables to a height of one of the second placing tables to transfer the object from the one of the first placing tables to the one of the second placing tables by the conveying unit, wherein the lifting and lowering apparatus is further capable of executing a return operation that lifts or lowers the first or the second shelf member to adjust a height of the one of the second placing tables to a height of another of the first placing tables, thereby transferring the object that the outbound operation has transferred to the one of the second placing tables to the another of the first placing tables by the conveying unit, and wherein the lifting and lowering apparatus is capable of repeating the outbound and the return operations according to necessity to transfer the object to a desired height.

The conveying unit can convey the object in both the normal direction and the reverse direction, and which direction is determined to be the normal direction or reverse direction does not matter.

Likewise, regarding the "outbound operation" and the "return operation", any direction may be the "outbound" direction.

In the lifting and lowering apparatus according to the present aspect, two shelf members (first shelf member and second shelf member), for example, are disposed adjacent to each other. Each shelf member includes a plurality of placing tables. The plurality of placing tables is positioned on different heights. Each placing table is provided with a conveying unit such as a conveyor.

In the lifting and lowering apparatus according to the present aspect, an object can be moved back and forth in zigzag between the placing tables (first placing table and second placing table) of the adjacent shelf members, and whereby the position of the object in the height direction can be changed.

Specifically, the lifting and lowering apparatus according to the present aspect executes the "outbound operation" for transferring the object from the placing table (one of the first placing tables) of one of the shelf members to the placing table (one of the second placing tables) of the other shelf member by the conveying unit with the placing tables (one of the first placing tables and one of the second placing tables) of the adjacent shelf members being on the same height. Then, the lifting and lowering mechanism is driven to change the state of the placing tables, being on the same height, of the adjacent shelf members. Specifically, the shelf members are moved in the vertical direction so that the placing table (one of the second placing tables) having the object placed thereon is on the same height as a placing table (different one of the first placing tables) which is positioned on a different height. Then, the lifting and lowering apparatus executes the "return operation" for transferring, by the conveying unit, the object to the placing table (different one of the first placing tables) which belongs to the one of the shelf members and which is positioned on a different height from the previous placing table.

The lifting and lowering apparatus repeats the outbound operation and the return operation, according to necessity to transfer the object to a location on a desired height while moving the object back and forth in zigzag.

Note that the "desired height" of the location to which the object is finally transferred is not limited to be different from a height of the location where the object has been input. The object input into the lifting and lowering apparatus may be lifted or lowered and discharged to a location on a height same as the height of the location where the object has been input.

Another aspect for solving the problem described above provides a lifting and lowering apparatus including: a first shelf member; a second shelf member disposed adjacent to the first shelf member; and a lifting and lowering mechanism that lifts and lowers at least one of the first and the second shelf members, the first shelf member including a plurality of first placing tables having a different height, the second shelf member including a plurality of second placing tables having a different height, and each of the first and the second shelf members including a conveying unit that conveys an object in both a normal direction and a reverse direction, wherein the lifting and lowering apparatus is capable of adjusting a height of one of the first placing tables to a height of one of the second placing tables to transfer and place the object from the one of the first placing tables to the one of the second placing tables by the conveying unit, wherein the lifting and lowering apparatus is further capable of lifting or lowering the first or the second shelf member to adjust a height of the one of the second placing tables to a height of another of the first placing tables, thereby transferring and placing the object that has been placed on the one of the second placing tables to the another of the first placing tables by the conveying unit, and wherein the lifting and lowering apparatus is capable of repeating transference of the object between the first and the second shelf members according to necessity to transfer the object to a desired height.

The lifting and lowering apparatus according to the present aspect also transfers the object from the placing table (one of the first placing tables) of one of the shelf members to the placing table (one of the second placing tables) of the other shelf member by the conveying unit with the placing tables (one of the first placing tables and one of the second placing tables) of the adjacent shelf members being on the same height. Then, the lifting and lowering mechanism is driven to change the state of the placing tables, being on the same height, of the adjacent shelf members. Specifically, the shelf members are moved in the vertical direction so that the placing table (one of the second placing tables) having the object placed thereon is on the same height as a placing table (different one of the first placing tables) which is positioned on a different height. Then, the lifting and lowering apparatus transfers, by the conveying unit, the object to the placing table (different one of the first placing tables) which belongs to the on of the shelf members and which is positioned on a different height from the previous placing table.

Preferably, the lifting and lowering mechanism simultaneously lifts and lowers the first and the second shelf members, and when the first shelf member is lifted by the lifting and lowering mechanism, the second shelf member is simultaneously lowered, whereas when the first shelf member is lowered, the second shelf member is simultaneously lifted.

According to this aspect, a time required for adjusting the placing tables (first placing table and second placing table) of the adjacent shelf members to be on the same height can be reduced.

It is preferable that, in each of the above aspects, the first shelf member and the second shelf member are connected to each other with a connecting unit so as to synchronously lift and lower.

According to this aspect, a time required for adjusting the placing tables (first placing table and second placing table) of the adjacent shelf members to be on the same height can be reduced.

It is preferable that, in each of the above aspects, each of the placing tables is provided with a load sensor that detects the presence of the object.

According to this aspect, the conveying unit to be driven can be limited.

It is preferable that, in each of the above aspects, the lifting and lowering apparatus transfers the object on conditions that the object is present on the first placing table and the object is not present on the second placing table having a same absolute height as that of the first placing table and to which the object is to be conveyed, or the object is present on the second placing table and the object is not present on the first placing table having a same absolute height as that of the second placing tables and to which the object is to be conveyed.

According to this aspect, collision between objects can be avoided.

It is preferable that, in each of the above aspects, the plurality of the first placing tables are vertically arranged inside the first shelf member such that an interval between the adjacent first placing tables is equal, the plurality of the second placing tables are vertically arranged inside the second shelf member such that an interval between the adjacent second placing tables is equal, and the lifting and lowering mechanism stops the shelf members after lifting or lowering the shelf members by an amount corresponding to the interval or a half of the interval.

It is preferable that, in each of the above aspects, the lifting and lowering apparatus includes a lifting and lowering unit constituted by combining the first and the second shelf members, wherein at least one delivery space is provided at each side of the lifting and lowering unit.

It is preferable that, in each of the above aspects, the lifting and lowering apparatus includes a station device having stations positioned at different heights, wherein the station device is disposed at a position adjacent to the first or the second shelf member, and wherein the object is delivered between the station and the first or the second placing table.

It is preferable that, in each of the above aspects, the lifting and lowering apparatus includes a station device having stations positioned on different heights, wherein an interval between the adjacent stations of the station device is substantially equal to an interval between the adjacent first placing tables or the adjacent second placing tables, and wherein the first or the second shelf member is lifted and lowered by the lifting and lowering mechanism by an amount corresponding to a height or a half height of the interval between the adjacent stations.

An aspect regarding a method for lifting and lowering an object, the method including: providing a first station and a second station that are positioned at different heights; providing a first shelf member and a second shelf member that is disposed adjacent to the first shelf member; wherein the first shelf member includes a plurality of first placing tables positioned at different heights, whereas the second shelf member includes a plurality of second placing tables positioned at different heights, and wherein the first and the second shelf members lift and lower synchronously, such that when one of the first and the second shelf members lifts, the other lowers, whereas when the other lifts, the one lowers, adjusting a height of one of the first placing tables to a height of the first station to transfer an object placed on the first station to the one of the first placing tables; changing a height of the first shelf member and a height of the second shelf member simultaneously to adjust a height of the one of the first placing tables to a height of one of the second placing tables; transferring the object from the one of the first placing tables to the one of the second placing tables; changing a height of the first shelf member and a height of the second shelf member again simultaneously to adjust a height of the one of the second placing tables to a height of another of the first placing tables; transferring the object from the one of the second placing tables to the another of the first placing tables; repeating transference of the object between the first and the second shelf members according to necessity to transfer the object to a desired height; and discharging the object to the second station.

Effect of Invention

The lifting and lowering apparatus according to the present invention can change the route of an object in a height direction and provide high conveyance efficiency when objects are sorted in the height direction.

BRIEF DESCRIPTION OF DRAWINGS

FIGS. 3A and 3B are front views of the lifting and lowering apparatus illustrated in FIG. 1, wherein FIG. 3A illustrates a state where a first shelf member is higher than a second shelf member, and FIG. 3B illustrates a state where the second shelf member is higher than the first shelf member.

FIGS. 5A to 5C are front views illustrating an operation of the lifting and lowering apparatus in FIG. 1, and illustrate a condition in each stage when an object is transferred from a left fifth-story station L5 to a right first-story station R1.

BEST MODE FOR CARRYING OUT THE INVENTION

Embodiments of the present invention will now be described.

A lifting and lowering apparatus 1 according to the present embodiment includes a lifting and lowering unit 2, a left station device 3, and a right station device 5.

Figure 1:
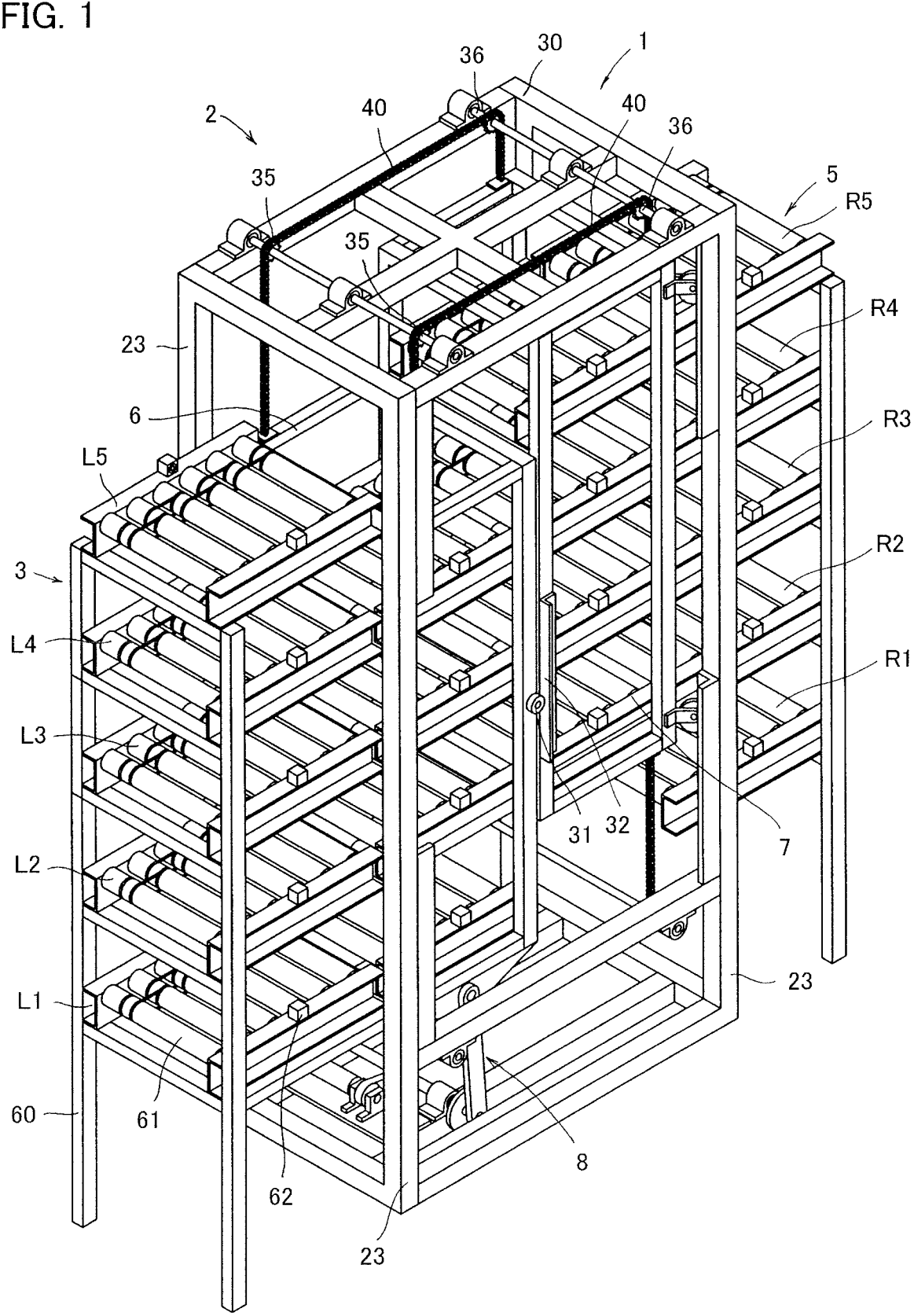
FIG. 1 is a perspective view of a lifting and lowering apparatus according to an embodiment of the present invention.
Figure 2:
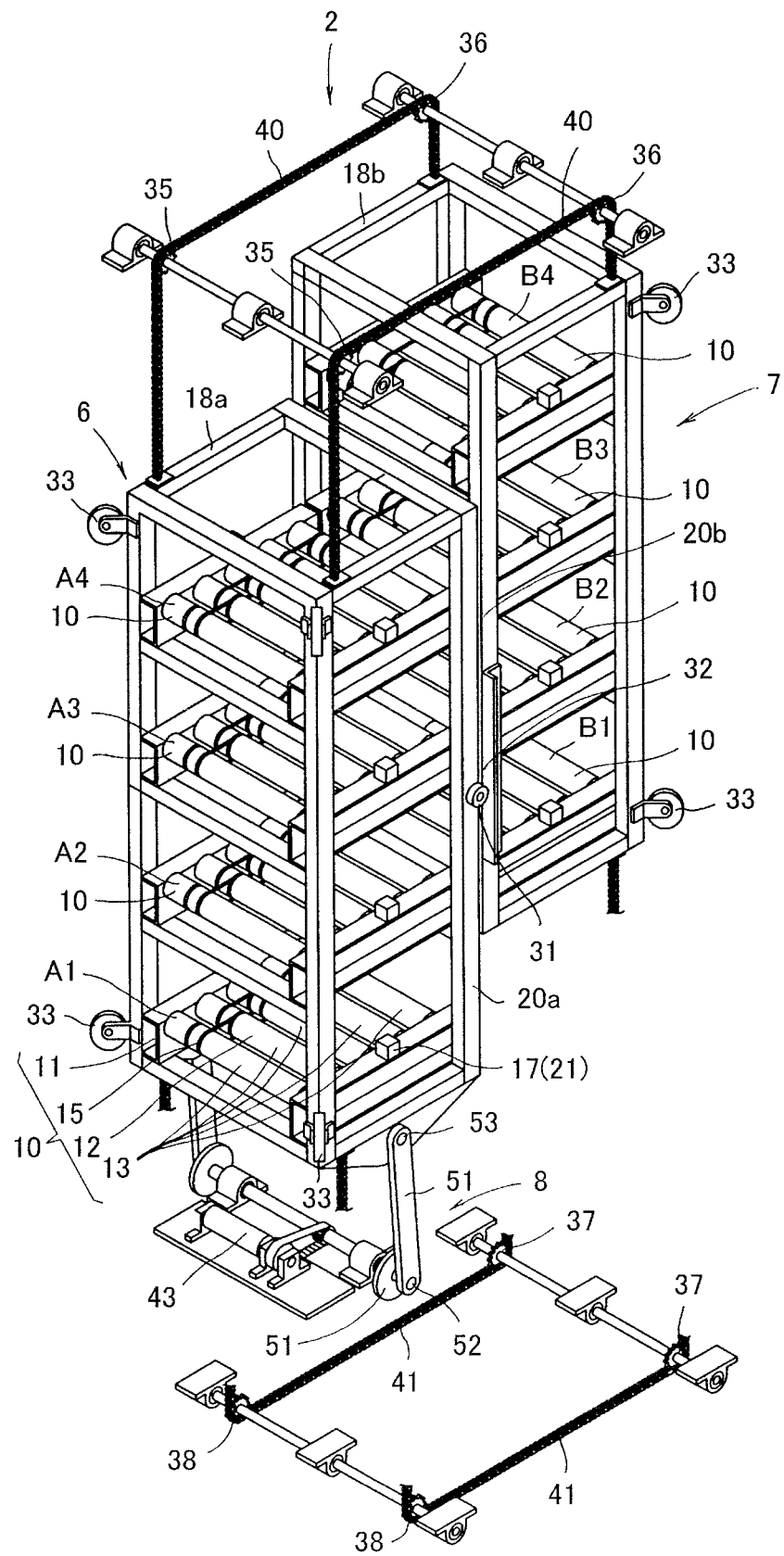
FIG. 2 is a perspective view of the main part of a lifting and lowering unit in the lifting and lowering apparatus illustrated in FIG. 1.

The lifting and lowering unit 2 includes, inside an outer frame 30, two shelf members 6 and 7 and a lifting and lowering mechanism 8, as illustrated in FIGS. 1 and 2. For convenience in description, the shelf member 6 depicted on the left of each figure is referred to as a first shelf member 6, and the shelf member 7 depicted on the right is referred to as a second shelf member 7.

The first shelf member 6 and the second shelf member 7 have the same structure except for a boundary portion provided with a roller 31 and a guide 32, and therefore, the first shelf member 6 will be mainly described.

The first shelf member 6 has a lifting frame 18a as illustrated in FIG. 2, and includes placing tables A (first placing tables) with a four-story structure mounted inside the lifting frame 18a.

For convenience in description, the placing tables A on the respective floors are referred to as a first-story placing table A1, second-story placing table A2, third-story placing table A3, and fourth-story placing table A4, respectively.

The four placing tables A are spaced at regular intervals in the height direction and are mounted inside the lifting frame 18. The intervals between adjacent placing tables A are the same.

The placing tables A on the respective floors have the same structure provided with a compact conveyor device (conveying unit) 10. The conveyor device 10 includes a motorized roller 12 and a follower roller 13 which are mounted to a frame 11. The motorized roller 12 is internally equipped with a motor (not illustrated) and a speed reducer (not illustrated) inside a roller body, and the roller body rotates when the internal motor is energized. The follower roller 13 is an idler roller.

A belt 15 is stretched between the motorized roller 12 and the follower roller 13 and between the follower rollers 13. When the motorized roller 12 rotates, the follower rollers 13 rotate accordingly.

In the present embodiment, the conveyor devices 10 mounted to the respective placing tables A can convey an object M in both the normal direction and the reverse direction.

A load sensor 17 is attached to the placing table A on each floor. The load sensor 17 is a transmissive photoelectric sensor including a light-emitting member (not illustrated) and a light-receiving member 21 that receives light emitted from the light-emitting member. The load sensor 17 detects that the object M is on the placing table A, when the light-receiving member 21 cannot receive light due to the object M blocking light.

The load sensor 17 is not particularly limited, and it may be a reflective photoelectric sensor. The load sensor 17 may also be a component using other physical phenomena.

The second shelf member 7 is the same as the first shelf member 6 in structure as described above. Therefore, like parts are given like reference signs, and the duplicate description will be omitted.

However, for convenience in description, alphabets 'A' and 'a' used for the placing tables on the respective floors in the first shelf member 6 are changed to 'B' and 'b' for the second shelf member 7.

Therefore, the second shelf member 7 has a lifting frame 18b as illustrated in FIG. 2, and includes placing tables B (second placing tables) with a four-story structure mounted inside the lifting frame 18b.

The placing tables B on the respective floors are referred to as a first-story placing table B1, second-story placing table B2, third-story placing table B3, and fourth-story placing table B4, respectively.

The first shelf member 6 and the second shelf member 7 are hung side by side from the outer frame 30 as described later. The roller 31 and the guide 32 are provided at the boundary between the first shelf member 6 and the second shelf member 7 which are adjacent to each other.

Specifically, the roller 31 is provided to a vertical member 20a which is a part of the lifting frame 18a of the first shelf member 6 and which faces the second shelf member 7.

The guide 32 is provided to a vertical member 20b which is a part of the lifting frame 18b of the second shelf member 7 and which faces the first shelf member 6.

Rollers 33 are provided to an external portion of each of the first shelf member 6 and the second shelf member 7 which are adjacent to each other.

The outer frame 30 of the lifting and lowering unit 2 is formed into a rectangular parallelepiped shape using a steel material as illustrated in FIG. 1.

As illustrated in FIGS. 1 and 2, two upper sprockets 35 and two upper sprockets 36 are provided inside the outer frame 30 at an upper end. Further, two lower sprockets 37 and two lower sprockets 38 are provided inside the outer frame 30 at a lower end.

Guides (not illustrated) are mounted to four vertical members 23 which constitute sides of the outer frame 30.

The first shelf member 6 and the second shelf member 7 are hung from the outer frame 30 with a wire rod (connecting unit) 40 such as chains or wires. In the present embodiment, a chain is used as the wire rod 40.

That is, the lifting frame 18a of the first shelf member 6 and the lifting frame 18b of the second shelf member 7 are connected to each other at their top surfaces by means of the wire rod 40. Specifically, the lifting frame 18a is connected to one end of the wire rod 40, and the lifting frame 18b is connected to the other end of the wire rod 40.

As illustrated in FIGS. 1 and 2, the intermediate part of the wire rod 40 is engaged with the upper sprockets 35 and 36 provided at the upper end of the outer frame 30.

Thus, the first shelf member 6 and the second shelf member 7 are hung by the wire rod 40 hanging down from the upper sprockets 35 and 36 with the weight of the lifting frames 18a and 18b being supported by the upper sprockets 35 and 36.

Further, regarding the lower parts of the lifting frames 18a and 18b, their bottom surfaces are connected to each other by means of a wire rod 41 which is engaged with the lower sprockets 37 and 38 provided at the lower part of the outer frame 30.

Thus, the first shelf member 6 and the second shelf member 7 are circularly connected to each other with the wire rods 40 and 41. Therefore, like a balance scale, when one of the first shelf member 6 and the second shelf member 7 moves up, the other moves down by the same distance.

Note that the rollers 33 of the lifting frames 18a and 18b are engaged with the guides (not illustrated) provided to the vertical members constituting the sides of the outer frame 30.

The roller 31 and the guide 32 mounted at the boundary between the lifting frames 18a and 18b are engaged with each other.

Therefore, the first shelf member 6 and the second shelf member 7 freely moves only in the vertical direction.

Subsequently, the lifting and lowering mechanism 8 will be described.

In the present embodiment, the lifting and lowering mechanism 8 using a crank mechanism is employed.

Specifically, the lifting and lowering mechanism 8 includes a rotary disk 50 and a link rod 51 as illustrated in FIGS. 2 and 3. The rotary disk 50 and the link rod 51 are connected to each other with a pin 52 in a rotatable manner. The other end of the link rod 51 and the lifting frame 18a are also connected to each other with a pin 53 in a rotatable manner.

The rotary disk 50 is slowly rotated by a geared motor 43. Further, the stop position of the rotary disk 50 is determined by an encoder or a limit switch which is not illustrated.

Figure 3A:
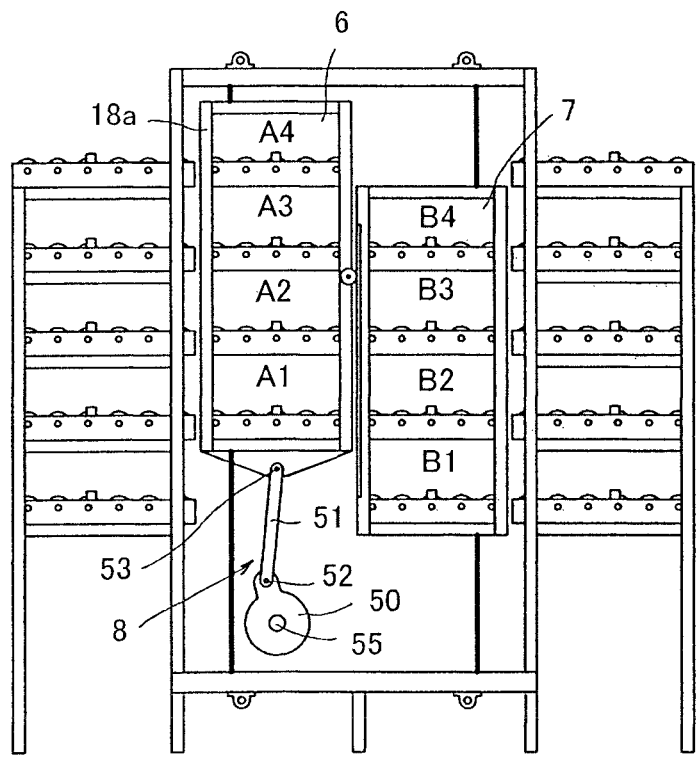
Figure 3B:
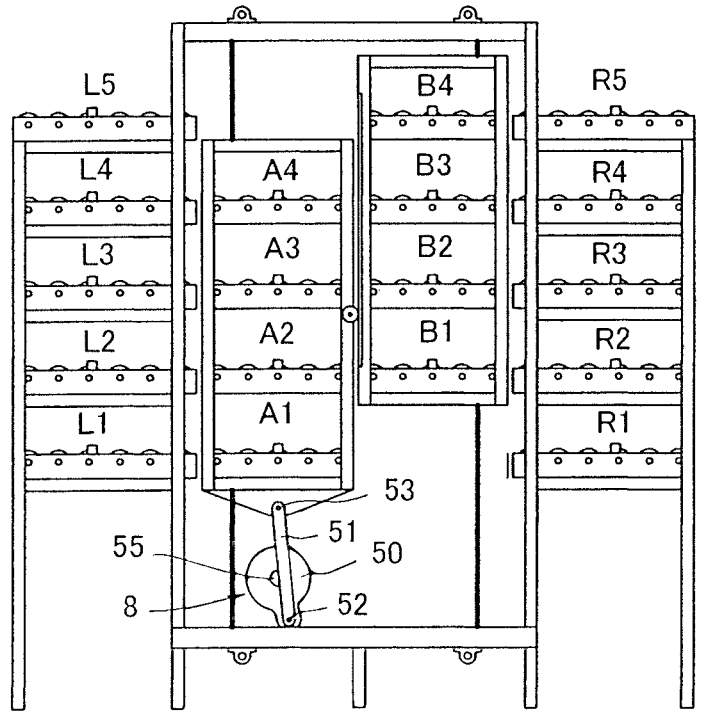

In the present embodiment, the rotary disk 50 stops at an ascending position where the pin 52 is located almost just above a rotation center 55 of the rotary disk 50 as illustrated in FIG. 3A and at a descending position where the pin 52 is located almost just below the rotation center 55 of the rotary disk 50 as illustrated in FIG. 3B.

In the present embodiment, when the rotary disk 50 stops at the ascending position as illustrated in FIG. 3A, the first shelf member 6 and the second shelf member 7 are shifted from each other in height such that the first shelf member 6 is higher than the second shelf member 7.

Thus, each of the placing tables A of the shelf member 6 is on the same height as the placing table B of the shelf member 7, which is one floor above the placing table A.

In the present embodiment, the first shelf member 6 includes the first-story placing table A1, the second-story placing table A2, the third-story placing table A3, and the fourth-story placing table A4, and the second shelf member 7 also includes the first-story placing table B1, the second-story placing table B2, the third-story placing table B3, and the fourth-story placing table B4. When the rotary disk 50 stops at the ascending position, the first-story placing table A1 of the first shelf member 6 is on the same height as the second-story placing table B2 of the second shelf member 7, the second-story placing table A2 of the first shelf member 6 is on the same height as the third-story placing table B3 of the second shelf member 7, and the third-story placing table A3 of the first shelf member 6 is on the same height as the fourth-story placing table B4 of the second shelf member 7.

When the rotary disk 50 stops at the descending position as illustrated in FIG. 3B, the first shelf member 6 and the second shelf member 7 are shifted from each other in height such that the second shelf member 7 is higher than the first shelf member 6.

Thus, each of the placing tables A of the shelf member 6 is on the same height as the placing table B of the shelf member 7, which is one floor below the placing table A.

Specifically, the second-story placing table A2 of the first shelf member 6 is on the same height as the first-story placing table B1 of the second shelf member 7, the third-story placing table A3 of the first shelf member 6 is on the same height as the second-story placing table B2 of the second shelf member 7, and the fourth-story placing table A4 of the first shelf member 6 is on the same height as the third-story placing table B3 of the second shelf member 7.

Next, the left station device 3 and the right station device 5 will be described.

The left station device 3 and the right station device 5 have the same structure, and therefore, the left station device 3 will be mainly described.

The left station device 3 functions as a temporary storage site or a transit point when the object M is input and output, and has stations L (first stations) with a five-story structure. The stations L function as a delivery space.

For convenience in description, the stations (delivery spaces) on the respective floors are referred to as a left first-story station L1, left second-story station L2, left third-story station L3, left fourth-story station L4, and left fifth-story station L5, respectively.

The five stations L are spaced at regular intervals in the height direction within a support frame 60.

The interval between the adjacent stations L is the same as the interval between the adjacent placing tables A.

The structure of the stations L on the respective floors is the same as the structure of the placing tables A and B of the shelf members 6 and 7. Specifically, each station L is provided with a compact conveyor device (conveying unit) 61 that can convey the object M in both the normal direction and the reverse direction.

Further, each station L is provided with a load sensor 62.

Each station L includes a code reading device (not illustrated) that can detect a destination of the object M from a barcode, for example, attached on the object M.

The right station device 5 is the same as the left station device 3 in structure as described above. Therefore, like parts are given like reference signs, and the duplicate description will be omitted.

It is to be noted, however, that R is used as the alphabet for each station of the right station device 5 for convenience in description.

Therefore, the right station device 5 has stations R (second stations) with a five-story structure as illustrated in FIG. 3.

The stations on the respective floors are referred to as a right first-story station R1, right second-story station R2, right third-story station R3, right fourth-story station R4, and right fifth-story station R5.

Subsequently, the function of the lifting and lowering apparatus 1 according to the present embodiment will be described. The lifting and lowering apparatus 1 in the present embodiment is mounted to conveyance lines C having a three-dimensional five-story structure as illustrated in FIG. 4, for example, and can deliver the object M on the conveyance line C on each floor to the conveyance line on the different floor.

Figure 4:
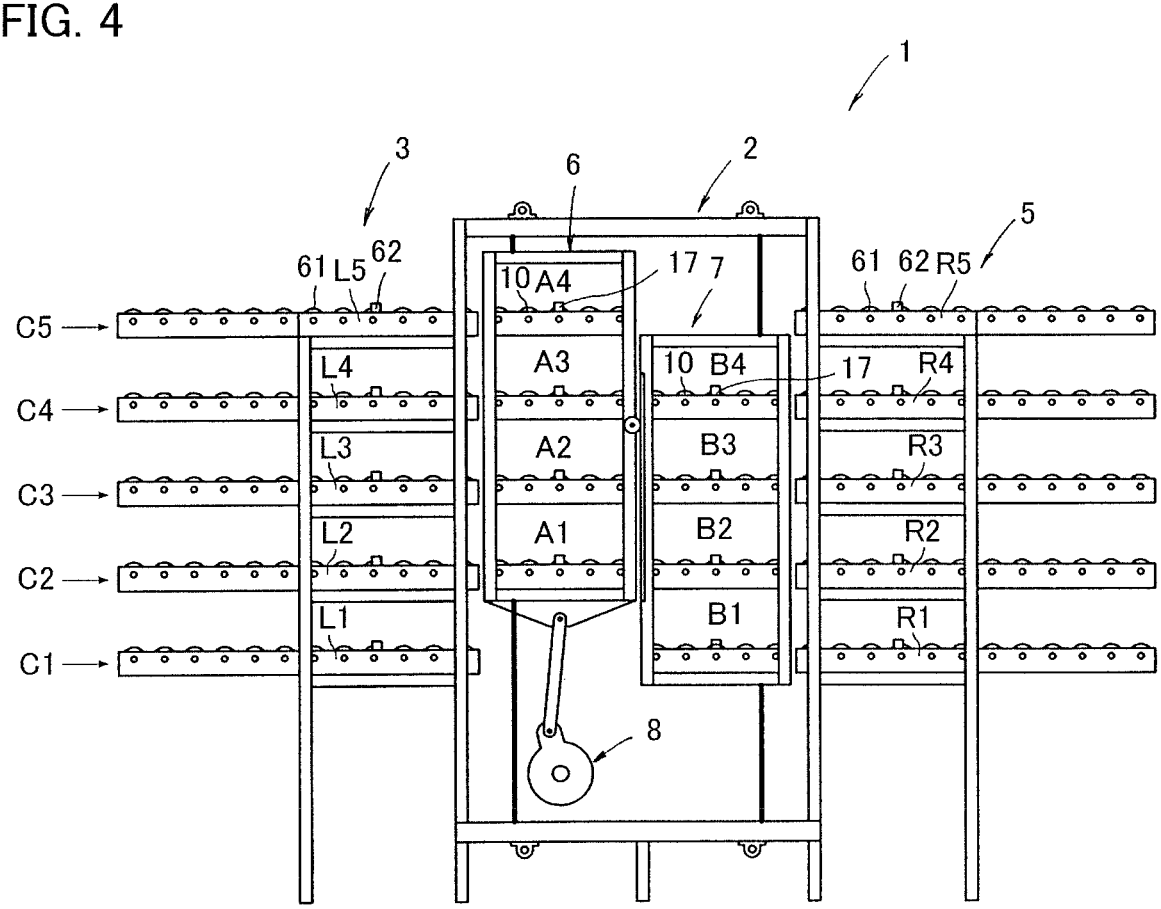
FIG. 4 is a front view of a conveyor line including the lifting and lowering apparatus illustrated in FIG. 1.

The conveyance lines C illustrated in FIG. 4 include a first-story line C1, second-story line C2, third-story line C3, fourth-story line C4, and fifth-story line C5.

The conveyance lines C on the respective floors are connected to the stations L of the left station device 3 on the respective floors and the stations R of the right station device 5 on the respective floors.

The lifting and lowering apparatus 1 in the present embodiment executes an outbound operation for transferring the object M from the placing table A (B) of the shelf member 6 (7) which is one of the shelf members 6 and 7 to the placing table B (A) of the other shelf member 7 (6) by the conveyor devices (conveying units) 10 of the placing tables A and B with the placing table A (B) of the shelf member 6 (7) being adjusted to be on the same height as the placing table B (A) of the other shelf member 7 (6).

Then, the lifting and lowering apparatus 1 drives the lifting and lowering mechanism 8 to lift and lower the first shelf member 6 and the second shelf member 7 so as to adjust the placing table B (A) of the other shelf member 7 (6) to be on the same height as another placing table A (B) which belongs to the shelf member 6 (7) and is positioned on the different height.

The lifting and lowering apparatus 1 then executes a return operation for transferring the object M, which has been previously moved by the outbound operation, to another placing table which belongs to the shelf member 6 (7) and which is on the different height from the previous placing table A (B), by the conveying unit.

The lifting and lowering apparatus 1 repeats the outbound operation and return operation as necessary. Thus, the object M moves back and forth between the placing tables A and B of the adjacent shelf members 6 and 7 in zigzag with the position in the height direction being changed, and is discharged to the station L or R on a desired height.

A specific example will now be described.

In the present embodiment, the outbound operation and the return operation are executed by driving the conveyor devices (conveying unit) 10 of the placing tables A and B on the same height. Specifically, the conveyor device 10 of the placing table A (B) on which the object M is placed is driven in the direction toward the other placing table B (A), thereby feeding the placed object M to the other placing table B (A). On the other hand, the conveyor device 10 of the other placing table B (A) is driven for drawing the object M into the other placing table B (A).

In the present embodiment, the load sensor 17 is provided to each of the placing tables A and B. Therefore, the presence or absence of the object M on each of the placing tables A and B can be identified.

In the present embodiment, the conveyor devices 10 of the placing tables A and B are driven to execute the outbound operation and the return operation on conditions that the object M is present on the placing table A (B) and the object M is not present on the placing table B (A) to which the object M is to be conveyed.

Further, the object M is delivered between the stations L on the respective floors of the station device 3 and the placing tables A of the shelf member 6 and between the stations R on the respective floors of the station device 5 and the placing tables B of the shelf member 7. In the present embodiment, the load sensor 62 is also provided to each of the stations L and R. Therefore, the absence or presence of the object M on each of the stations L and R can be identified.

In the present embodiment, the condition for the delivery of the object M between the station L (R) and the placing table A (B) of the shelf member 6 (7) is the same as the abovementioned condition for the delivery of the object M between the placing tables A and B. Specifically, the object M is delivered by driving the conveyor devices 10 and 61 on conditions that the object M is present on the station L (R) or the placing table A (B), and the object M is not present on the station R (L) or the placing table B (A) to which the object M is to be conveyed.

An operation for transferring the object M from the left fifth-story station L5 of the station device 3 to the right first-story station R1 will be described as one example.

FIG. 5 illustrates a condition in each stage when the object M is transferred from the left fifth-story station L5 of the station device 3 to the right first-story station R1.

In the state in FIG. 5A, the object M is on the left fifth-story station L5, the destination of the object M is read by the code reading device mounted to the left fifth-story station L5, and the read destination is transmitted to a controller not illustrated. Then, a sequence of operations described below is executed on the basis of a signal from the controller.

First, the lifting and lowering mechanism 8 is driven and stops so as to make the first shelf member 6 higher than the second shelf member 7 as illustrated in FIG. 5A. In this state, the left fifth-story station L5 and the fourth-story placing table A4 of the first shelf member 6 are on the same height.

While maintaining this state, the conveyor device 61 of the left fifth-story station L5 and the conveyor device 10 of the fourth-story placing table A4 are driven, whereby the object M is fed from the left fifth-story station L5 and drawn into the fourth-story placing table A4.

In the state illustrated in FIG. 5A, the object M is on the left fifth-story station L5, and therefore, the load sensor 62 on the left fifth-story station L5 detects the object M. On the other hand, the fourth-story placing table A4 of the first shelf member 6 is empty, and therefore, the load sensor 17 does not detect the object M. Therefore, the driving condition of the conveyor device 61 of the left fifth-story station L5 and the conveyor device 10 of the fourth-story placing table A4 is satisfied, and the conveyor device 61 and the conveyor device 10 are driven.

The conveyor devices 10 and 61 are stopped; after the load sensor 62 of the left fifth-story station L5 does not detect the object M, the load sensor 17 of the fourth-story placing table A4 detects the object M, and the drive of the conveyor device 10 of the fourth-story placing table A4 is subsequently maintained for a while.

Thus, the object M is transferred to the fourth-story placing table A4 from the left fifth-story station L5.

Subsequently, the lifting and lowering mechanism 8 is driven and stops so as to make the second shelf member 7 higher than the first shelf member 6 as illustrated in FIG. 5B. In this state, the fourth-story placing table A4 of the first shelf member 6 is on the same height as the third-story placing table B3 of the second shelf member 7.

With this state being maintained, the conveyor device 10 of the fourth-story placing table A4 of the first shelf member 6 and the conveyor device 10 of the third-story placing table B3 of the second shelf member 7 are driven, whereby the object M is fed from the fourth-story placing table A4 and drawn into the third-story placing table B3. In this way, the outbound operation is executed, The conveyor devices 10 and 61 are stopped; after the load sensor 17 of the fourth-story placing table A4 does not detect the object M, the load sensor 17 of the third-story placing table B3 detects the object M, and the drive of the conveyor device 10 of the third-story placing table B3 is subsequently maintained for a while.

As a result, the object M is transferred to the third-story placing table B3 of the second shelf member 7 from the fourth-story placing table A4 of the first shelf member 6.

Subsequently, the lifting and lowering mechanism 8 is again driven and stops so as to make the first shelf member 6 higher than the second shelf member 7 as illustrated in FIG. 5C. In this state, the third-story placing table B3 of the second shelf member 7 is on the same height as the second-story placing table A2 of the first shelf member 6.

With this state being maintained, the conveyor device 10 of the third-story placing table B3 of the second shelf member 7 and the conveyor device 10 of the second-story placing table A2 of the first shelf member 6 are driven whereby the object M is fed from the third-story placing table B3 and drawn into the second-story placing table A2. In this way, the return operation is executed.

Subsequently, as illustrated in FIG. 5D, the lifting and lowering mechanism 8 is again driven and stops so as to make the second shelf member 7 higher than the first shelf member 6, whereby the second-story placing table A2 of the first shelf member 6 and the first-story placing table B1 of the second shelf member 7 are on the same height. Then, the conveyor devices 10 are driven to transfer the object M from the second-story placing table A2 to the first-story placing table B1. In this way, the second outbound operation is executed.

Subsequently, the lifting and lowering mechanism 8 is again driven and stops so as to make the first shelf member 6 higher than the second shelf member 7, whereby the first-story placing table B1 and the right first-story station R1 are on the same height as illustrated in FIG. 5E. Then, the conveyor devices 10 and 61 are driven to transfer the object M from the first-story placing table B1 to the right first-story station R1.

In this way, the object M is transferred in zigzag with the position in the height direction being changed little by little, and discharged to the station on a desired height.

In the example described with reference to FIG. 5, the object M is conveyed while being lowered. However, the object M can be conveyed to the upper station L or R while being lifted.

FIG. 6 illustrates a condition in each stage when the object M is transferred from the left first-story station L1 to the right fifth-story station R5.

Figure 6A:
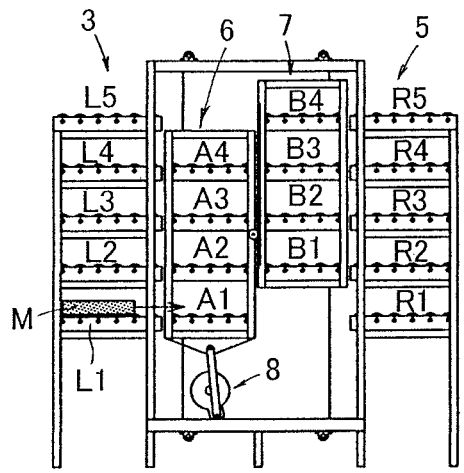
FIGS. 6A to 6C are front views illustrating an operation of the lifting and lowering apparatus in FIG. 1, and illustrate a condition in each stage when an object is transferred from a left first-story station L1 to a right fifth-story station R5.

In this case, the lifting and lowering mechanism 8 is driven and stops so as to make the second shelf member 7 higher than the first shelf member 6, whereby the left first-story station L1 and the first-story placing table A1 are on the same height as illustrated in FIG. 6A. Then, the conveyor device 61 of the left first-story station L1 and the conveyor device 10 of the first-story placing table A1 are driven to transfer the object M from the left first-story station L1 to the first-story placing table A1.

Figure 6B:
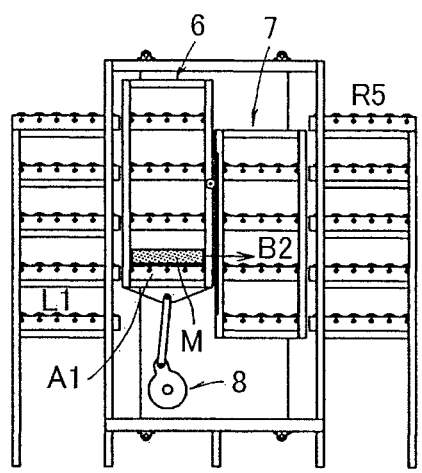

Subsequently, the lifting and lowering mechanism 8 is driven and stops so as to make the first-story placing table A1 of the first shelf member 6 and the second-story placing table B2 of the second shelf member 7 are on the same height as illustrated in FIG. 6B, and the conveyor devices 10 of both placing tables A1 and B2 are driven to transfer the object M from the first-story placing table A1 to the second-story placing table B2 (outbound operation).

Figure 6C:
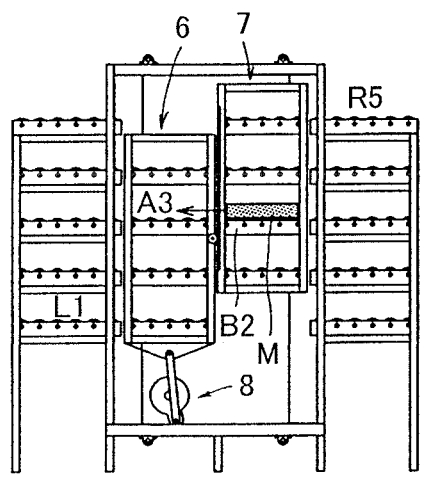

Subsequently, the lifting and lowering mechanism 8 is driven and stops so as to make the second-story placing table B2 of the second shelf member 7 and the third-story placing table A3 of the first shelf member 6 are on the same height as illustrated in FIG. 6C, and the conveyor devices 10 of both placing tables B2 and A3 are driven to transfer the object M from the second-story placing table B2 to the third-story placing table A3 (return operation).

Figure 6D:
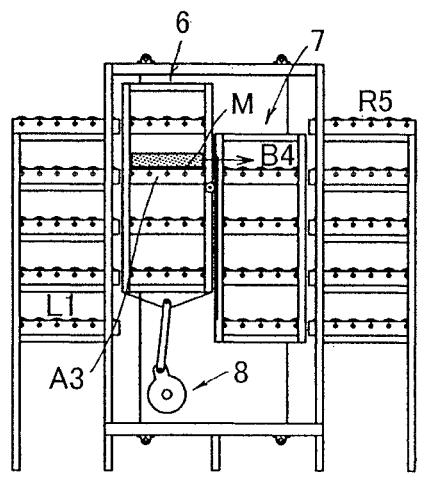

Subsequently, the lifting and lowering mechanism 8 is driven and stops so as to make the third-story placing table A3 of the first shelf member 6 and the fourth-story placing table B4 of the second shelf member 7 are on the same height as illustrated in FIG. 6D, and the conveyor devices 10 of both placing tables A3 and B4 are driven to transfer the object M from the third-story placing table A3 to the fourth-story placing table B4 (second outbound operation).

Figure 6E:
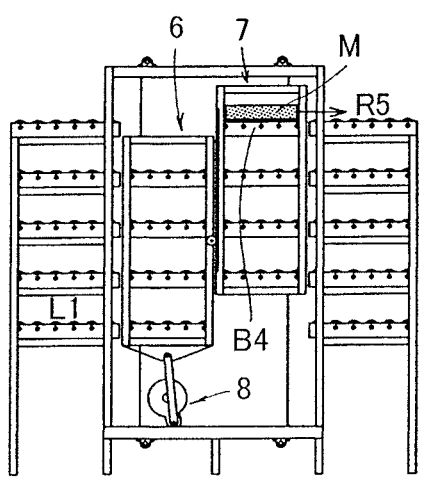

Subsequently, the lifting and lowering mechanism 8 is driven and stops so as to make the fourth-story placing table B4 of the second shelf member 7 and the right fifth-story station R5 are on the same height as illustrated in FIG. 6E, and the conveyor devices 10 and 61 of the fourth-story placing table B4 and the right fifth-story station R5 are driven to transfer the object M from the fourth-story placing table B4 to the right fifth-story station R5.

In the example described above, the object M is transferred one by one. However, the objects M can be sequentially transferred.

Figure 7A:
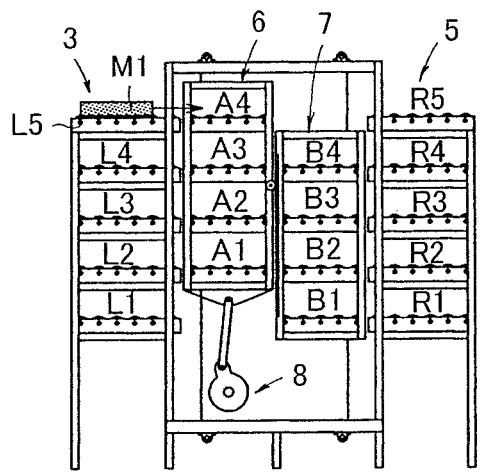
FIGS. 7A to 7F are front views illustrating an operation of the lifting and lowering apparatus in FIG. 1, and illustrate a condition in each stage when objects are sequentially transferred from the left fifth-story station L5 to the right first-story station R1.
Figure 7B:
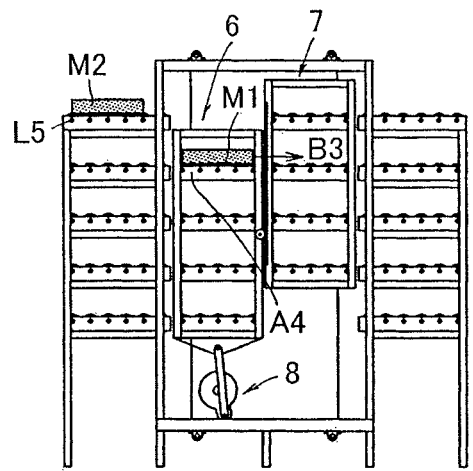
Figure 7C:
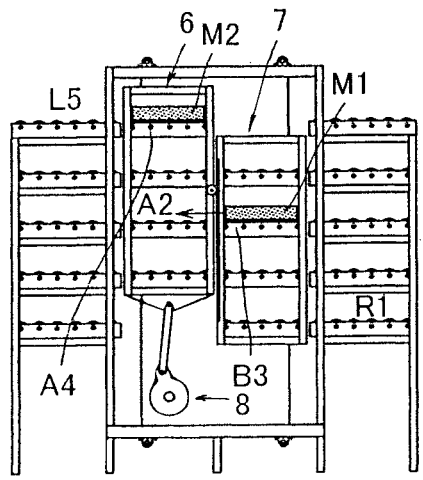
Figure 7D:
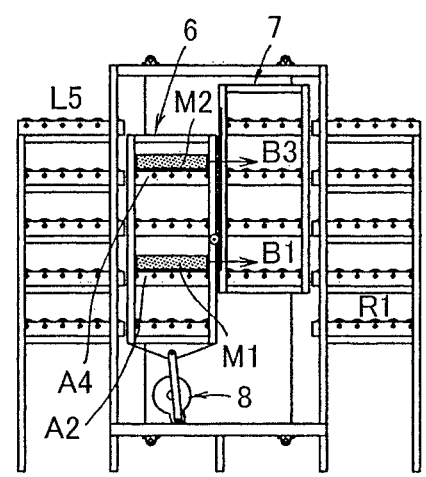
Figure 7E:
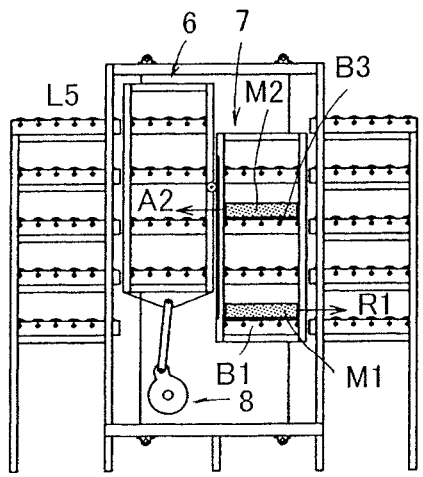
Figure 7F:
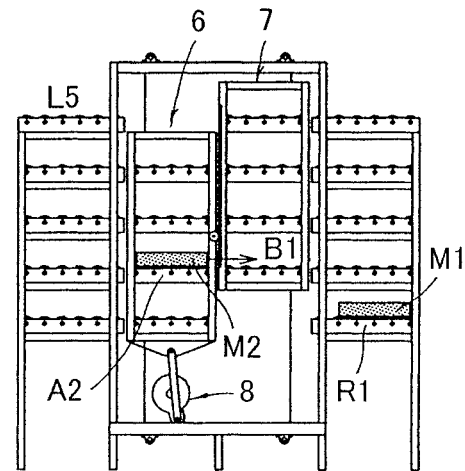
Figure 8A:
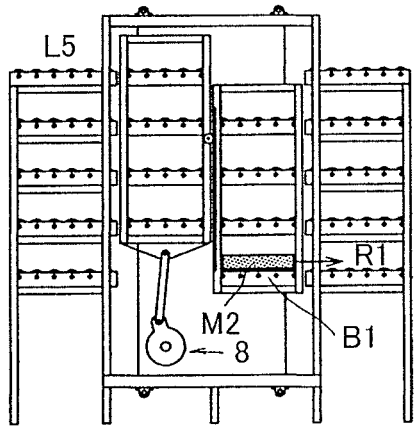
FIGS. 8A and 8B are front views illustrating an operation of the lifting and lowering apparatus in FIG. 1, and illustrate a condition in each stage subsequent to the stages in FIG. 7 when objects are sequentially transferred from the left fifth-story station L5 to the right first-story station R1.
Figure 8B:
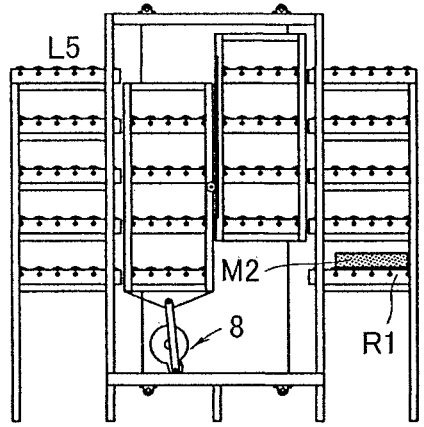

FIGS. 7 and 8 illustrate an example in which the object M is transferred from the left fifth-story station L5 of the station device 3 to the right first-story station R1, as in the example illustrated in FIG. 5. However, in FIGS. 7 and 8, before one object M1 reaches the destination, a next object M2 reaches the left fifth-story station L5 and is fed into the fourth-story placing table A4.

Specifically, the stages in FIGS. 7A and 7B are the same as the stages illustrated in FIG. 5, but in FIG. 7C, when the fourth-story placing table A4 which is empty is lifted up to the height of the left fifth-story station L5 of the station device 3, the next object M2 is transferred to the fourth-story placing table A4.

Accordingly, the added object M2 reaches the destination, right first-story station R1, in the same manner as described previously.

The movement of the preceding object M1 is the same as the movement described with reference to FIG. 5.

The object M2 which is input later also reaches the destination, right first-story station R1, along the same route as illustrated in FIG. 5.

In the example described above, the object M is transferred to the same location. However, a plurality of objects M can be transferred to different locations at a time.

FIG. 9 illustrates an example where the object M1 is transferred from the left first-story station L1 to the right fifth-story station R5 and at the same time, another object M2 is transferred from the right first-story station R1 to the left fifth-story station L5.

Figure 9A:
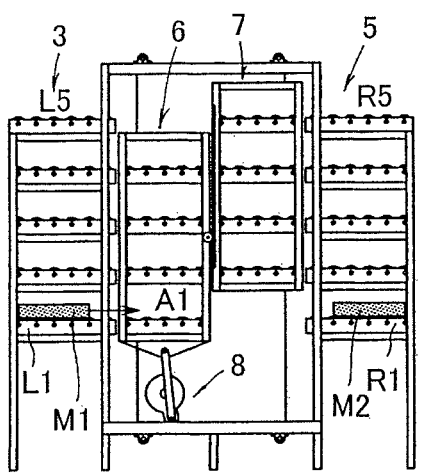
FIGS. 9A to 9F are front views illustrating an operation of the lifting and lowering apparatus in FIG. 1, and illustrate a condition in each stage when an object is transferred from the left first-story station L1 to the right fifth-story station R5, and at the same time, another object is transferred from the right first-story station R1 to the left fifth-story station L5.

In this example, the object M1 is located on the left first-story station L1, and another object M2 is located on the right first-story station R1, as illustrated in FIG. 9A.

First, the first shelf member 6 stops when the first shelf member 6 becomes lower than the second shelf member 7, whereby the left first-story station L1 and the first-story placing table A1 are on the same height. Then, the conveyor devices 10 and 61 are driven to transfer the object M1 from the left first-story station L1 to the first-story placing table A1.

Figure 9B:
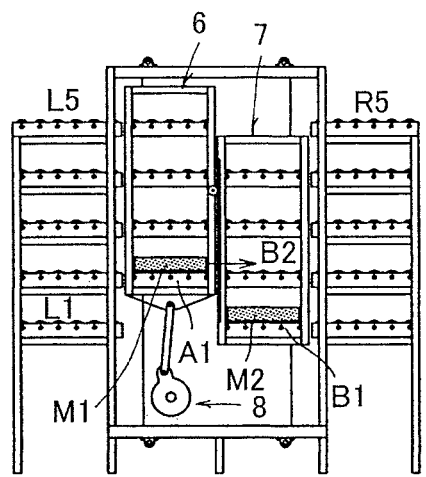

Subsequently, the lifting and lowering mechanism 8 is driven so that the first-story placing table A1 of the first shelf member 6 and the second-story placing table B2 of the second shelf member 7 are on the same height as illustrated in FIG. 9B, and the conveyor devices 10 of both placing tables A1 and B2 are driven to transfer the object M1 from the first-story placing table A1 to the second-story placing table B2.

In this case, the right first-story station R1 and the first-story placing table B1 are on the same height, and thus, the object M2 is fed into the first-story placing table B1 from the right first-story station R1 by driving the conveyor device 10 of the first-story placing table B1 and the conveyor device 61 of the right first-story station R1.

Figure 9C:
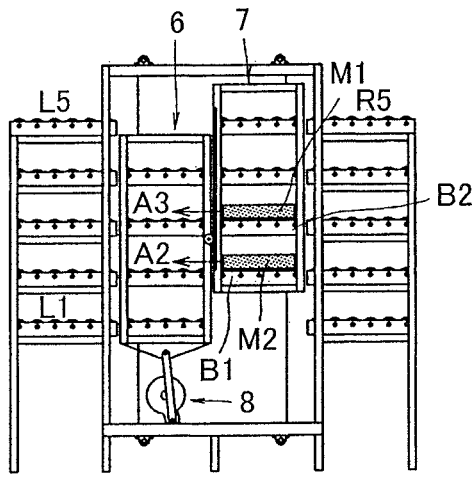

Subsequently, the lifting and lowering mechanism 8 is driven so that the second-story placing table B2 of the second shelf member 7 and the third-story placing table A3 of the first shelf member 6 are on the same height as illustrated in FIG. 9C, and the conveyor devices 10 of both placing tables B2 and A3 are driven to transfer the object M1 from the second-story placing table B2 to the third-story placing table A3.

In this case, the first-story placing table B1 and the second-story placing table A2 are on the same height, and thus, the object M2 is transferred from the first-story placing table B1 to the second-story placing table A2 by driving the conveyor devices 10.

Figure 9D:
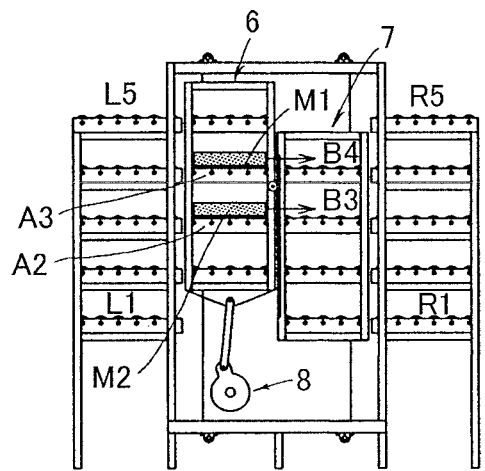

Subsequently, the lifting and lowering mechanism 8 is driven so that the third-story placing table A3 of the first shelf member 6 and the fourth-story placing table B4 of the second shelf member 7 are on the same height as illustrated in FIG. 9D, and the conveyor devices 10 of both placing tables A3 and B4 are driven to transfer the object M1 from the third-story placing table A3 to the fourth-story placing table B4.

In this case, the second-story placing table A2 and the third-story placing table B3 are on the same height, and thus, the object M2 is transferred from the second-story placing table A2 to the third-story placing table B3 by driving the conveyor devices 10.

Figure 9E:
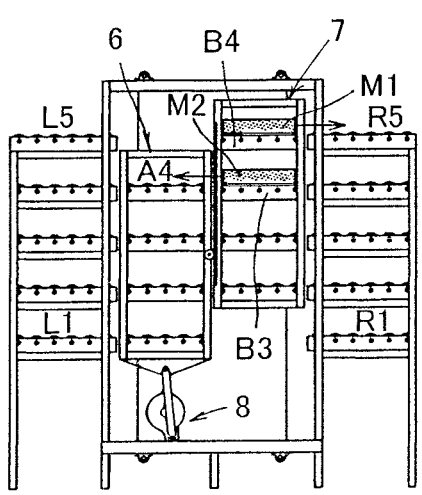

Subsequently, the lifting and lowering mechanism 8 is driven so that the fourth-story placing table B4 of the second shelf member 7 and the right fifth-story station R5 are on the same height as illustrated in FIG. 9E, and the conveyor devices 10 and 61 of the fourth-story placing table B4 and the right fifth-story station R5 are driven to transfer the object M1 from the fourth-story placing table B4 to the right fifth-story station R5.

In this case, the third-story placing table B3 and the fourth-story placing table A4 are on the same height, and thus, the object M2 is transferred from the third-story placing table B3 to the fourth-story placing table A4 by driving the conveyor devices 10.

Figure 9F:
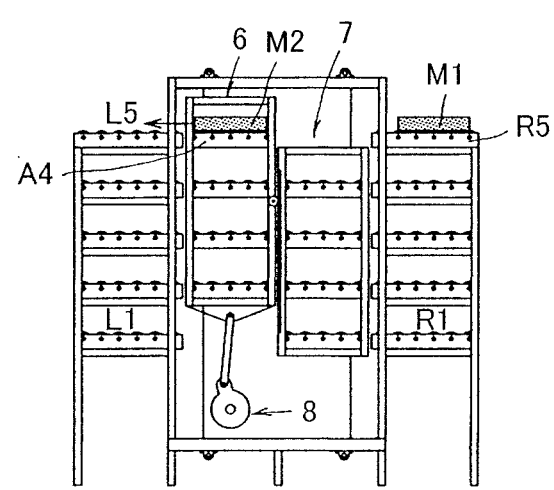

Subsequently, the lifting and lowering mechanism 8 is driven so that the fourth-story placing table A4 of the first shelf member 6 and the left fifth-story station L5 are on the same height as illustrated in FIG. 9F, and the conveyor devices 10 and 61 of the fourth-story placing table A4 and the left fifth-story station L5 are driven to transfer the object M2 from the fourth-story placing table A4 to the left fifth-story station L5.

FIG. 10 illustrates a condition where the object M1 is transferred from the left first-story station L1 to the right fifth-story station R5 and at the same time, another object M2 is transferred from the left fifth-story station L5 to the right first-story station R1.

FIG. 10 illustrates an example where the object M2 is transferred from the left fifth-story station L5 to the right first-story station R1 as in FIG. 5 and at the same time, the object M1 is transferred from the left first-story station L1 to the right fifth-story station R5 as in FIG. 6.

Figure 10A:
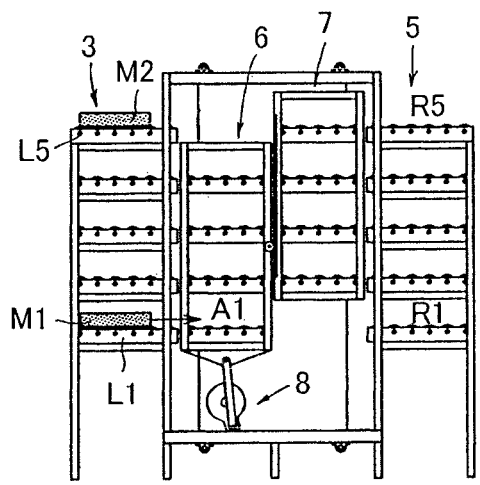
FIGS. 10A to 10F are front views illustrating an operation of the lifting and lowering apparatus in FIG. 1, and illustrate a condition in each stage when an object is transferred from the left first-story station L1 to the right fifth-story station R5, and at the same time, another object is transferred from the left fifth-story station L5 to the right first-story station R1.

Specifically, the lifting and lowering mechanism 8 is driven and stops so as to make the second shelf member 7 higher than the first shelf member 6 as illustrated in FIG. 10A, and whereby the left first-story station L1 and the first-story placing table A1 are on the same height, and the object M1 is transferred from the left first-story station L1 to the first-story placing table A1.

Figure 10B:
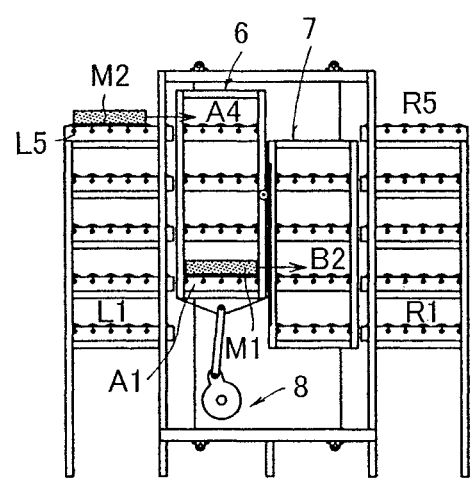

Subsequently, the lifting and lowering mechanism 8 is driven so that the first-story placing table A1 of the first shelf member 6 and the second-story placing table B2 of the second shelf member 7 are on the same height as illustrated in FIG. 10B, and the object M1 is transferred from the first-story placing table A1 to the second-story placing table B2.

In this case, the left fifth-story station L5 and the fourth-story placing table A4 are on the same height, and thus, the object M2 is transferred from the left fifth-story station L5 to the fourth-story placing table A4.

Figure 10C:
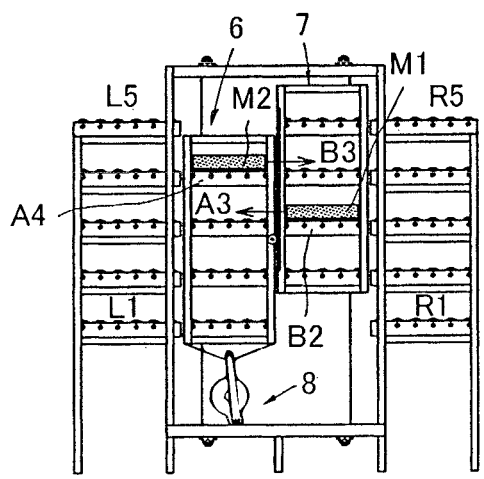

Subsequently, the lifting and lowering mechanism 8 is driven so that the second-story placing table B2 of the second shelf member 7 and the third-story placing table A3 of the first shelf member 6 are on the same height as illustrated in FIG. 10C, and the object M1 is transferred from the second-story placing table B2 to the third-story placing table A3.

In this case, the fourth-story placing table A4 and the third-story placing table B3 are on the same height, and thus, the object M2 is transferred from the fourth-story placing table A4 to the third-story placing table B3.

Figure 10D:
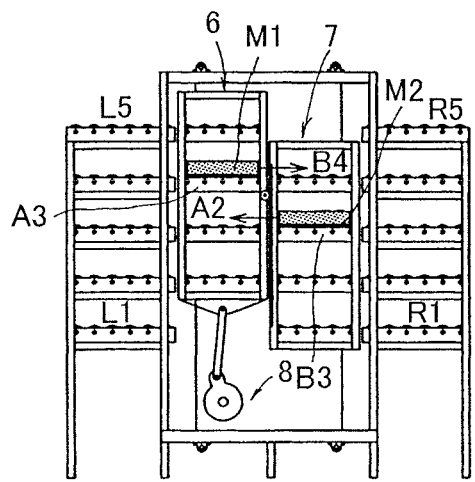

Subsequently, the lifting and lowering mechanism 8 is driven so that the third-story placing table A3 of the first shelf member 6 and the fourth-story placing table B4 of the second shelf member 7 are on the same height as illustrated in FIG. 10D, and the object M1 is transferred from the third-story placing table A3 to the fourth-story placing table B4.

In this case, the third-story placing table B3 and the second-story placing table A2 are on the same height, and thus, the object M2 is transferred from the third-story placing table B3 to the second-story placing table A2.

Figure 10E:
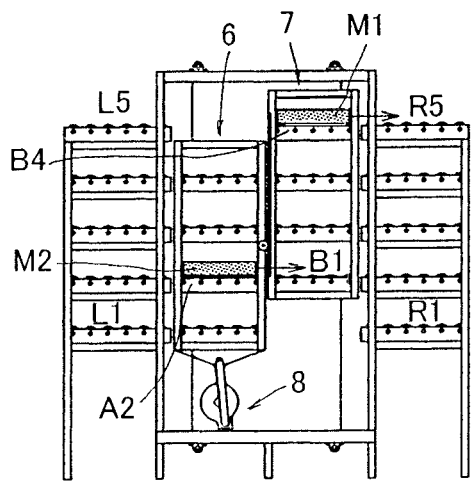

Subsequently, the lifting and lowering mechanism 8 is driven so that the fourth-story placing table B4 of the second shelf member 7 and the right fifth-story station R5 are on the same height as illustrated in FIG. 10E, and the object M1 is transferred from the fourth-story placing table B4 to the right fifth-story station R5.

In this case, the second-story placing table A2 and the first-story placing table B1 are on the same height, and thus, the object M2 is transferred from the second-story placing table A2 to the first-story placing table B1.

Figure 10F:
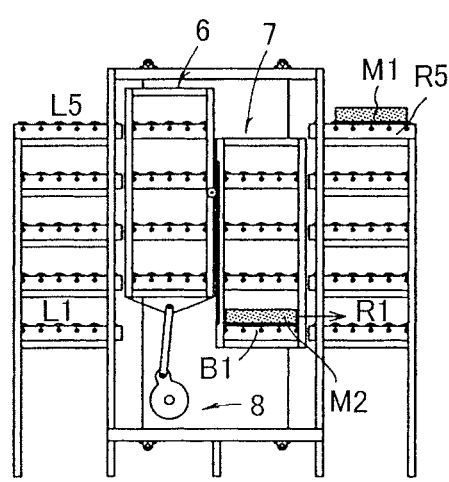

Subsequently, the lifting and lowering mechanism 8 is driven so that the first-story placing table B1 and the right first-story station R1 are on the same height as illustrated in FIG. 10F, and the object M2 is transferred from the first-story placing table B1 to the right first-story station R1.

In the embodiment described above, a crank mechanism is used as the lifting and lowering mechanism 8. However, the lifting and lowering mechanism 8 is not limited to the crank mechanism, and may employ other mechanisms such as a cam assembly.

Figure 11:
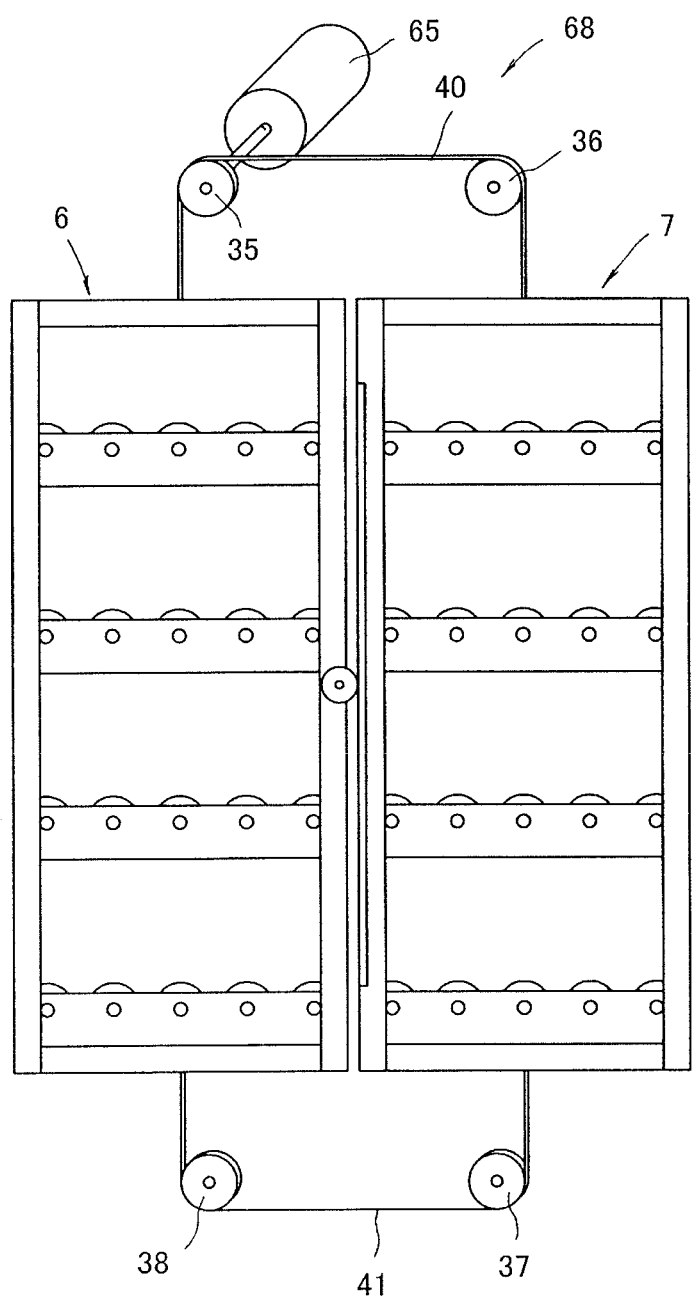
FIG. 11 is a view illustrating a structure of a lifting and lowering mechanism of a lifting and lowering apparatus according to another embodiment of the present invention.

Further, a lifting and lowering apparatus 68 illustrated in FIG. 11, for example, may be used to lift and lower the first shelf member 6 and the second shelf member 7 by rotating a sprocket 35 with a single rotating unit 65, such as a geared motor, attached to the sprocket 35.

With the lifting and lowering apparatus 68 illustrated in FIG. 11, the shelf members 6 and 7 can be lifted and lowered to have any height.

In the embodiment described above, the first shelf member 6 and the second shelf member 7 are connected to each other also at their lower parts with the wire rod 41, so that the first shelf member 6 and the second shelf member 7 are circularly connected with the wire rods 40 and 41. However, the wire rod 41 at the lower parts may not be used.

The configuration in the above embodiment is recommended because, due to the first shelf member 6 and the second shelf member 7 being connected with each other at their upper parts by the wire rod 40, the lateral weight balance can be ensured, and the first shelf member 6 and the second shelf member 7 can be synchronously moved. However, an independent lifting and lowering mechanism may be provided to each of the first shelf member 6 and the second shelf member 7.

In the above embodiment, both the first shelf member 6 and the second shelf member 7 ascend and descend. However, only one of them may ascend and descend.

In the above embodiment, the first shelf member 6 and the second shelf member 7 stop after ascending or descending by an amount corresponding to the height of one story of the placing tables A and B. For example, during the process from the state in FIG. 5A to the state in FIG. 5B, the fourth-story placing table A4 of the first shelf member 6 descends from the height of the left fifth-story station L5 to the height of the left fourth-story station L4 which is one floor below the left fifth-story station L5, and then, stops. During this process, the fourth-story placing table B4 of the second shelf member 7 ascends from the height of the right fourth-story station R4 to the height of the right fifth-story station R5 which is one floor above the right fourth-story station R4, and then, stops.

In the above embodiment, each of the placing tables A and B of the first shelf member 6 and the second shelf member 7 always stops at a position on the same height as the station L or R of each floor, and does not stop at an intermediate floor.

However, the present invention is not limited to this configuration, and the placing tables A and B may stop at an intermediate floor.

For example, every time the lifting and lowering mechanism 8 operates, each of the shelf members 6 and 7 may stop after ascending or descending by an amount corresponding to the height of a half story. If the crank mechanism is used as the lifting and lowering mechanism 8, the size of an arm (rotary disk 50) of a crank may be designed as appropriate or the rotation angle may be limited, whereby the placing tables A and B can be stopped on the intermediate floor.

When the lifting and lowering apparatus 68 illustrated in FIG. 11 is used, the placing tables A and B can be stopped on the intermediate floor by controlling the rotating speed of the rotating unit 65 such as a geared motor.

FIGS. 12 to 14 illustrate an operation when each of the shelf members 6 and 7 stops after ascending or descending by an amount corresponding to the height of a half story, every time the lifting and lowering mechanism 8 operates.

According to this configuration, when many objects M are transferred, the objects M can be lifted and lowered without making an empty floor having no object and thus, more objects can be transferred per unit time while being lifted and lowered.

When a lifting and lowering apparatus 70 illustrated in FIGS. 12 to 14 is used, the first shelf member 6 is on the same height as the second shelf member 7 in the stages illustrated in 12A, 12C, 12E, 13A, 13C, 13E, 14A, and 14C, and the first shelf member 6 stops with the height higher than the second shelf member 7 in the stages illustrated in 12B, 12D, 12F, 13B, 13D, 13F, 14B, and 14D.

When the first shelf member 6 is on the same height as the second shelf member 7 as in 12A, 12C, 12E, 13A, 13C, 13E, 14A, and 14C, the placing tables A and B on the respective floors of the first shelf member 6 and the second shelf member 7 are on the same height as the stations L and R.

When the first shelf member 6 stops with the height higher than the second shelf member 7 as in 12B, 12D, 12F, 13B, 13D, 13F, 14B, and 14D, the placing tables A and B on the respective floors are not on the same height as any of the stations L and R.

However, the shelf members 6 and 7 stop after ascending and descending by an amount corresponding to the height of a half story, respectively, and therefore, when the first shelf member 6 stops with the height higher than the second shelf member 7, the total of the lifting/lowering distance corresponds to the height of one story. Therefore, when the first shelf member 6 stops with the height higher than the second shelf member 7 as illustrated in 12B, 12D, 12F, 13B, 13D, 13F, 14B, and 14D, the placing table A belonging to the first shelf member 6 is on the same height as the placing table B which belongs to the second shelf member 7 and which is one floor below the placing table A.

The operation for sequentially transferring objects from the left first-story station L1 to the right fifth-story station R5 will be described with reference to FIGS. 12 to 14.

Figure 12A:
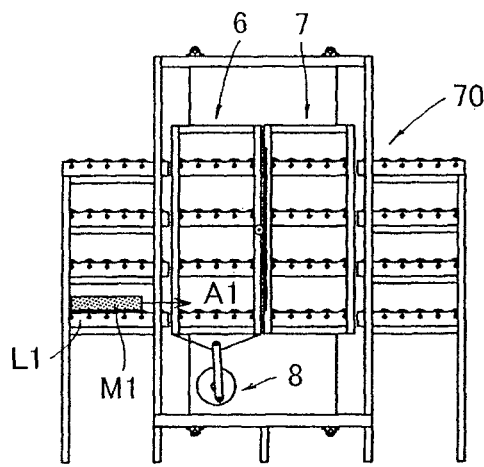
FIGS. 12A to 12F are front views illustrating an operation of a lifting and lowering apparatus according to still another embodiment of the present invention, and illustrate a condition in each stage when objects are sequentially transferred from the left first-story station L1 to the right fifth-story station R5.

When the object M1 is on the left first-story station L1 and the first shelf member 6 and the second shelf member 7 are on the same height as illustrated in FIG. 12A, the object M1 on the left first-story station L1 is transferred to the first-story placing table A1 of the first shelf member 6.

Figure 12B:
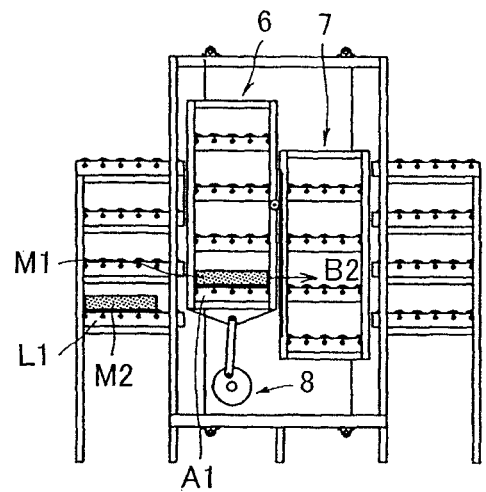

Then, the lifting and lowering mechanism 8 is driven so that the first shelf member 6 stops with the height higher than the second shelf member 7 as illustrated in FIG. 12B.

In this state, the placing tables A and B on the respective floors are not on the same height as any of the stations L and R, but the first-story placing table A1 of the first shelf member 6 is on the same height as the second-story placing table B2 of the second shelf member 7. Therefore, the object M1 is transferred from the first-story placing table A1 to the second-story placing table B2.

Figure 12C:
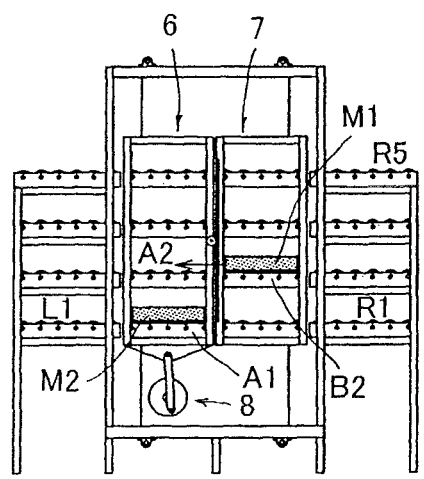

Subsequently, the lifting and lowering mechanism 8 is driven so that the first shelf member 6 and the second shelf member 7 are again on the same height as illustrated in FIG. 12C. In this state, the second-story placing table B2 of the second shelf member 7 is on the same height as the second-story placing table A2 of the first shelf member 6, and thus, the object M1 is transferred from the second-story placing table B2 of the second shelf member 7 to the second-story placing table A2 of the first shelf member 6.

Further, in this case, the first-story placing table A1 of the first shelf member 6 is returned to the height of the left first-story station L1, and thus, another object M2 is transferred to the first-story placing table A1 of the first shelf member 6.

In this state, the objects M1 and M2 are placed on the placing table A on the first floor and the placing table B on the second floor.

Figure 12D:
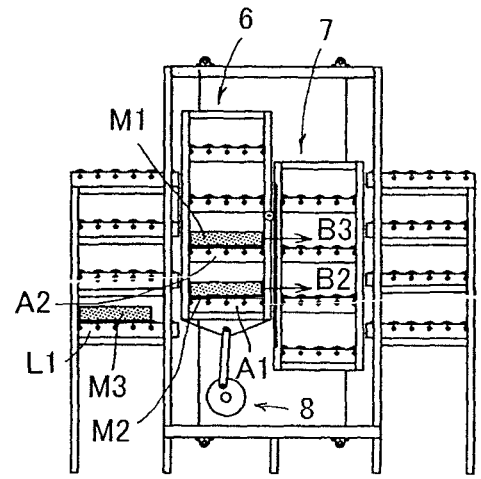

Subsequently, the lifting and lowering mechanism 8 is driven so that the first shelf member 6 stops with the height higher than the second shelf member 7 as illustrated in FIG. 12D.

In this state, the second-story placing table A2 of the first shelf member 6 is on the same height as the third-story placing table B3 of the second shelf member 7, and thus, the object M1 is transferred from the second-story placing table A2 to the third-story placing table B3.

Further, the first-story placing table A1 of the first shelf member 6 is on the same height as the second-story placing table B2 of the second shelf member 7, and thus, the object M2 is transferred from the first-story placing table A1 to the second-story placing table B2.

Figure 12E:
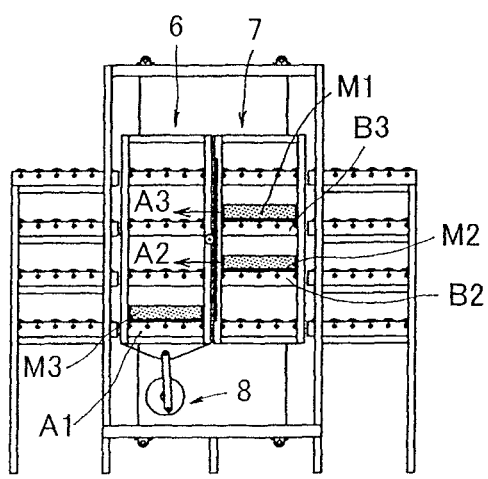
Figure 12F:
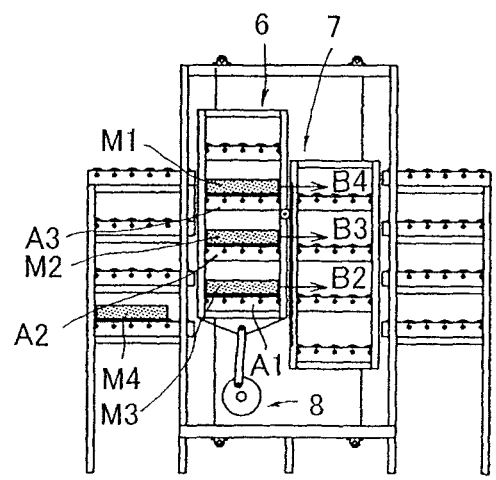
Figure 13A:
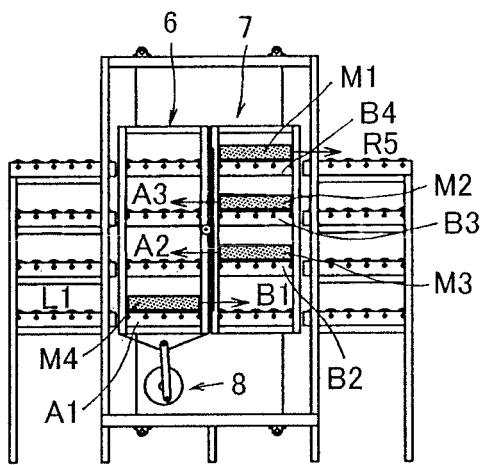
FIGS. 13A to 13F are front views illustrating an operation of the lifting and lowering apparatus according to still another embodiment of the present invention, and illustrate a condition in each stage subsequent to the stages in FIG. 12 when objects are sequentially transferred from the left first-story station L1 to the right fifth-story station R5.
Figure 13B:
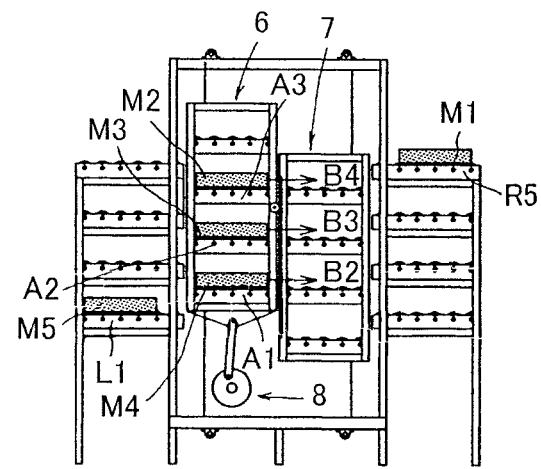
Figure 13C:
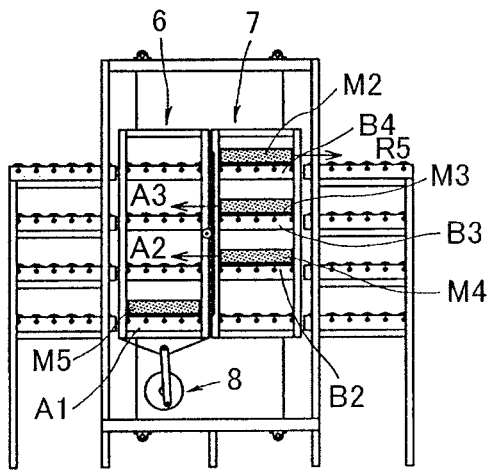
Figure 13D:
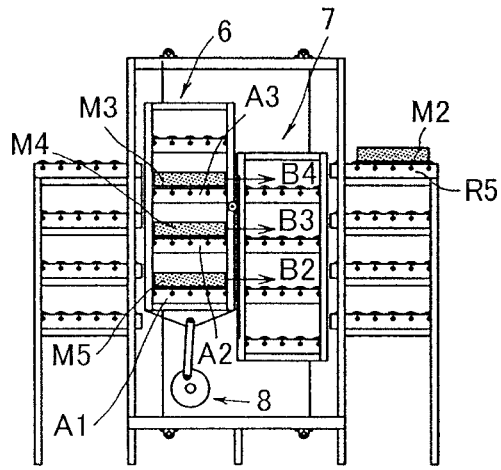
Figure 13E:
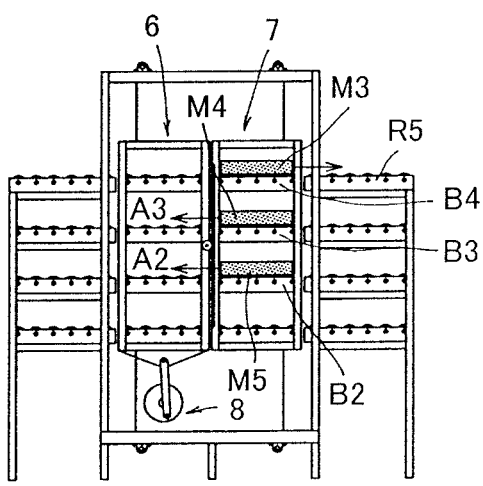
Figure 13F:
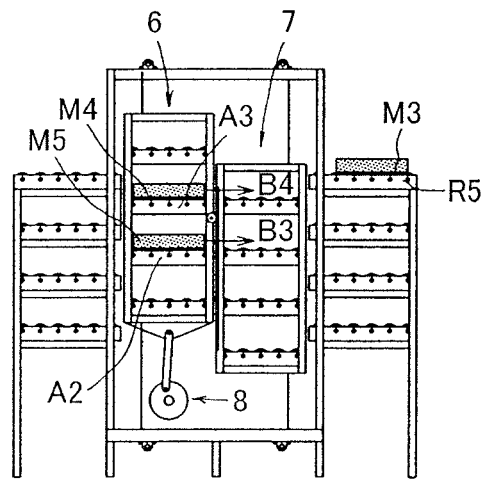
Figure 14A:
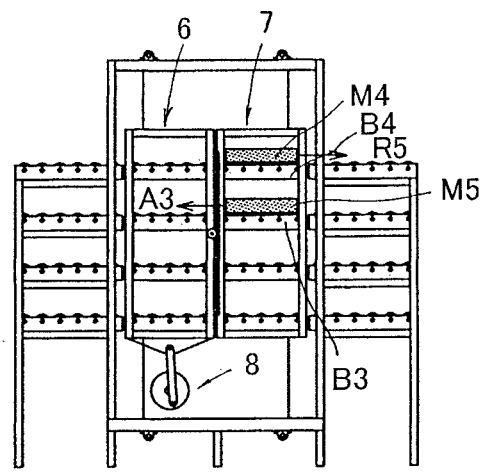
FIGS. 14A to 14D are front views illustrating an operation of the lifting and lowering apparatus according to still another embodiment of the present invention, and illustrate a condition in each stage subsequent to the stages in FIG. 13 when objects are sequentially transferred from the left first-story station L1 to the right fifth-story station R5.
Figure 14B:
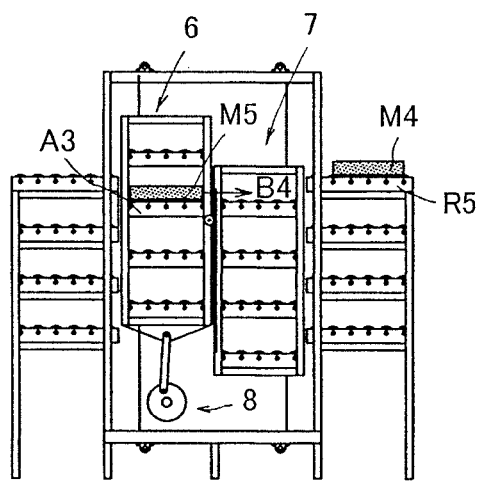
Figure 14C:
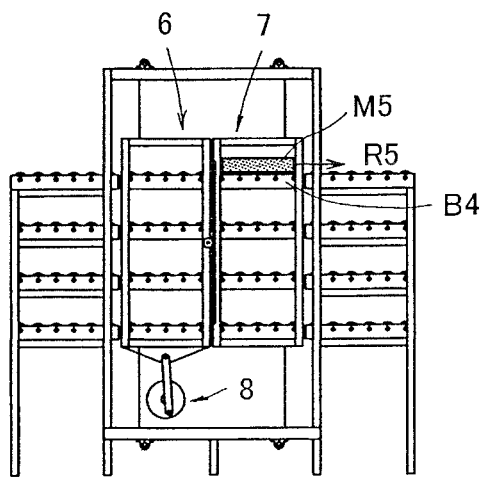
Figure 14D:
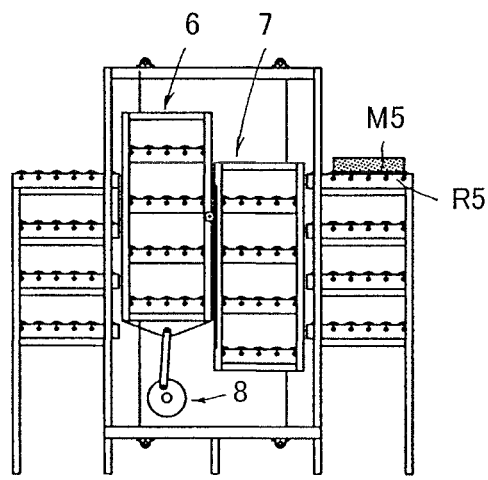

In FIG. 12E, the first-story placing table A1 of the first shelf member 6 is also returned to the height of the left first-story station L1, and thus, another object M3 is transferred to the first-story placing table A1 of the first shelf member 6.

After the process in FIG. 12E, the above processes are sequentially repeated, and whereby objects M1, M2, M3, and M4 are transferred, one by one, while being gradually lifted, and discharged onto the right fifth-story station R5.

In the present embodiment, the object M is placed on each floor, whereby the plurality of objects M can be sequentially transferred.

In the embodiment described above, the load sensors 17 and 62 are provided respectively to the placing tables A and B and stations L and R for detecting the presence/absence of the object M. However, a controller may be independently provided to the placing tables A and B and stations L and R to feed information indicating that the object M has been transferred, or information indicating that the object M has been transferred may be temporarily stored in a controller that entirely controls the apparatus, and the presence/absence of the object may be estimated. Accordingly, the conveyor devices (conveying unit) 10 and 61 of the placing tables A and B and the stations L and R may be driven.

In the embodiments described above, the lifting and lowering apparatus has two shelf members 6 and 7. However, the lifting and lowering apparatus may have three or more shelf members.

Lifting and lowering apparatuses 75 and 76 illustrated in FIG. 15 have four shelf members, respectively.

Figure 15A:
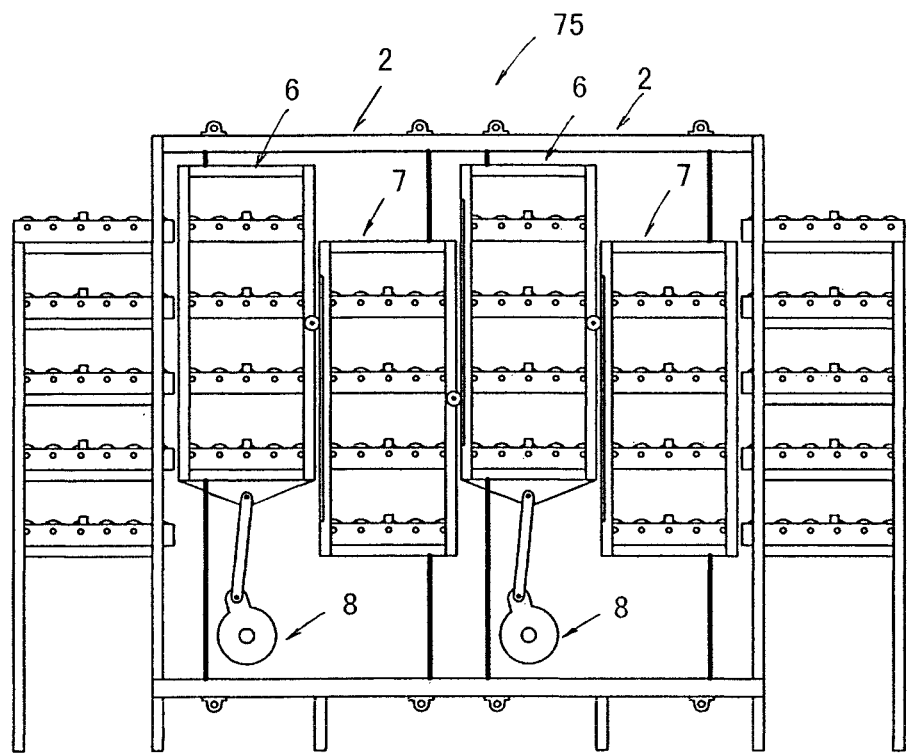
FIGS. 15A and 15B are front views of a lifting and lowering apparatus according to another embodiment of the present invention.

In the lifting and lowering apparatus 75 illustrated in FIG. 15A, two lifting and lowering units 2, each including two shelf members 6 and 7, are connected to each other.

Figure 15B:
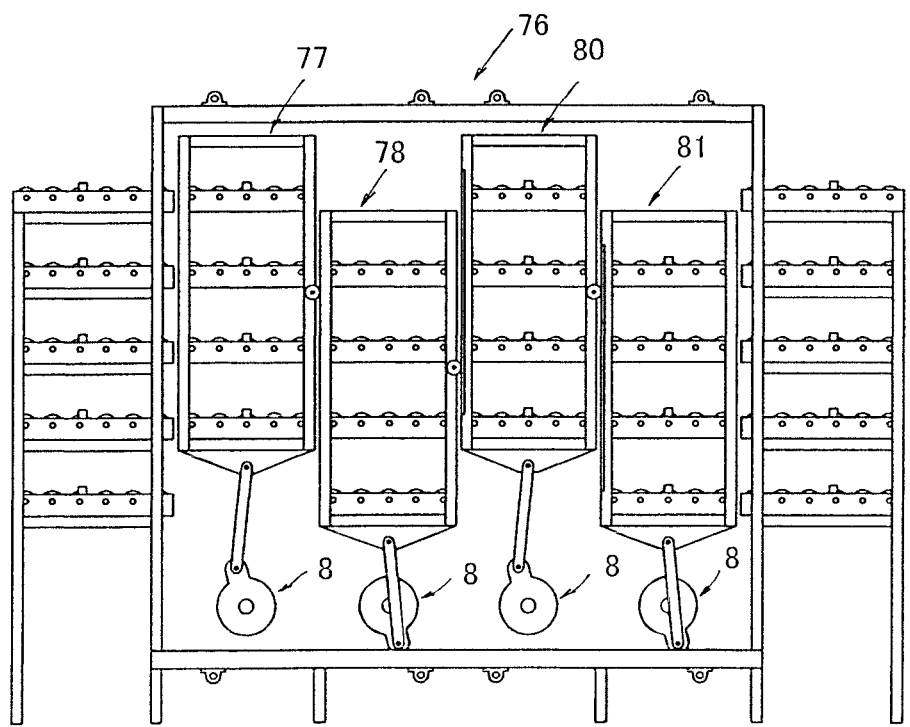

In the lifting and lowering apparatus 76 illustrated in FIG. 15B, four shelf members 77, 78, 80, and 81 are arranged in series. In the lifting and lowering apparatus 76 illustrated in FIG. 15B, each of the four shelf members 77, 78, 80, and 81 is provided with the lifting and lowering mechanism 8, whereby the four shelf members 77, 78, 80, and 81 can be independently lifted and lowered.

The lifting and lowering apparatus 1 described with reference to FIG. 1 and other figures repeats the outbound operation for transferring an object from a placing table belonging to one of the shelf members to a placing table belonging to the other shelf member and the return operation for transferring the object to a placing table which belongs to the one of the shelf members and is positioned on a different height from the previous placing table, thereby changing the position of the object M in the height direction. However, the lifting and lowering apparatuses 75 and 76 in FIG. 15 do not necessarily execute the return operation.

Figure 16A:
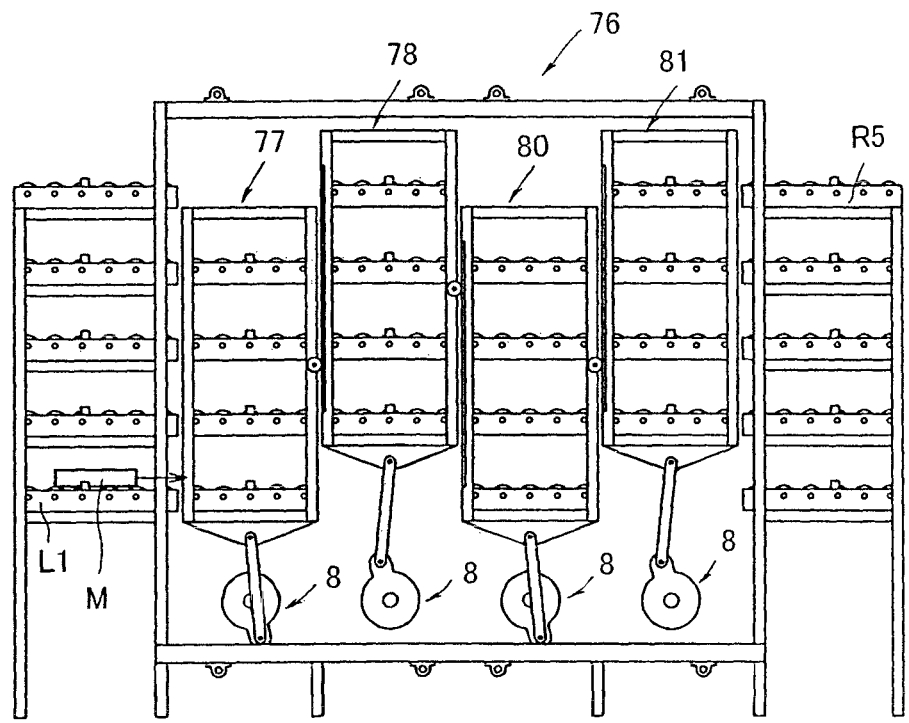
FIGS. 16A and 16B are front views illustrating an operation of the lifting and lowering apparatus in FIG. 15, and illustrate a condition in each stage when an object is transferred from a left first-story station L1 to a right fifth-story station R5.
Figure 16B:
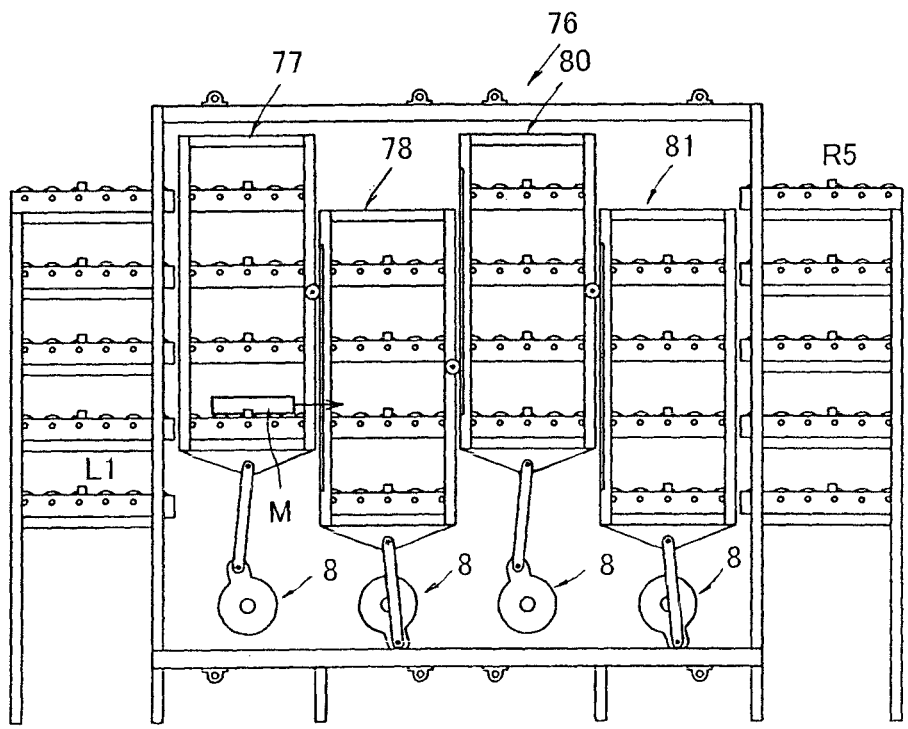
Figure 17A:
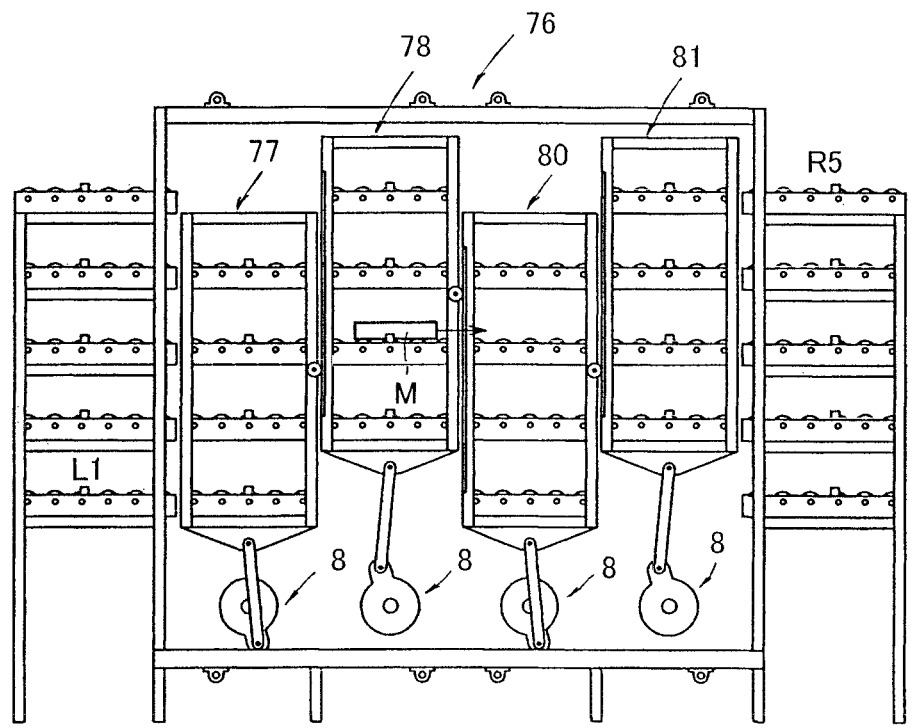
FIGS. 17A and 17B are front views illustrating an operation of the lifting and lowering apparatus in FIG. 15, and illustrate a condition in each stage subsequent to the stages in FIG. 16 when the object is transferred from the left first-story station L1 to the right fifth-story station R5.
Figure 17B:
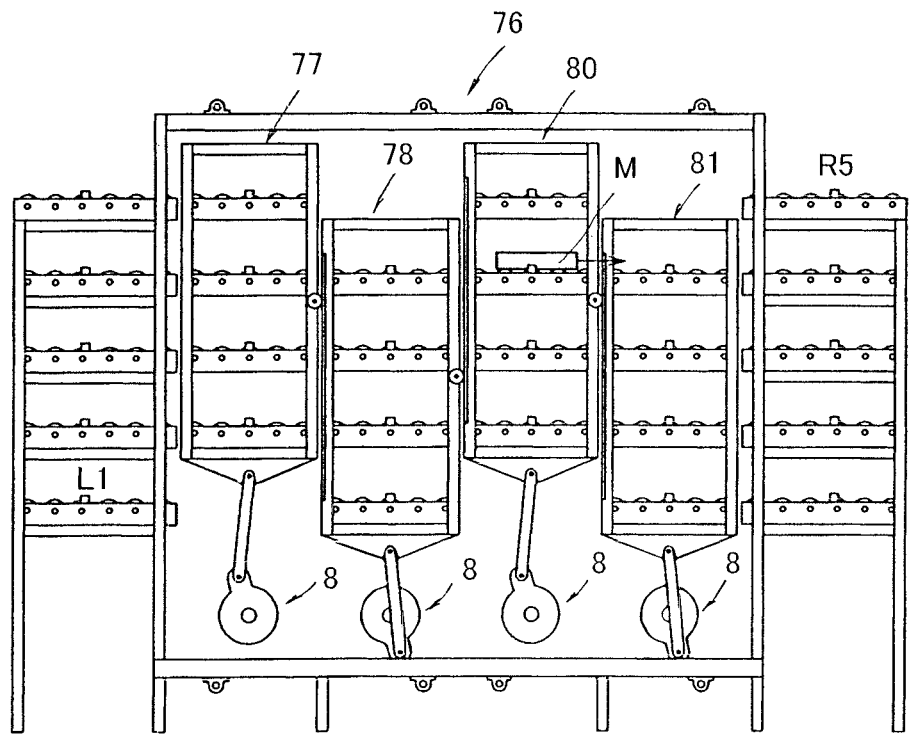
Figure 18A:
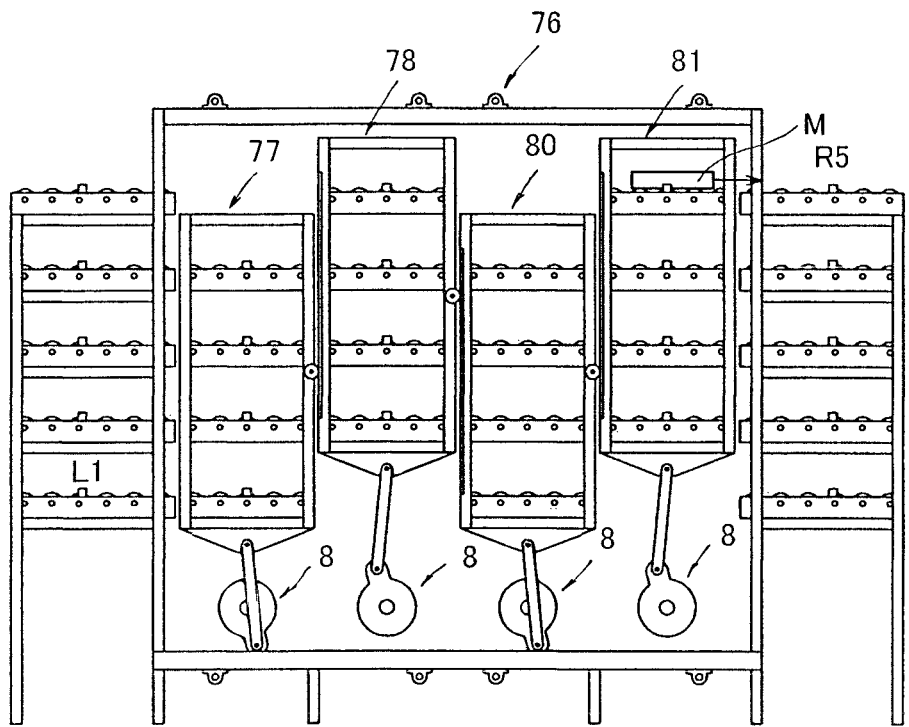
FIGS. 18A and 18B are front views illustrating an operation of the lifting and lowering apparatus in FIG. 15, and illustrate a condition in each stage subsequent to the stages in FIG. 17 when the object is transferred from the left first-story station L1 to the right fifth-story station R5.
Figure 18B:
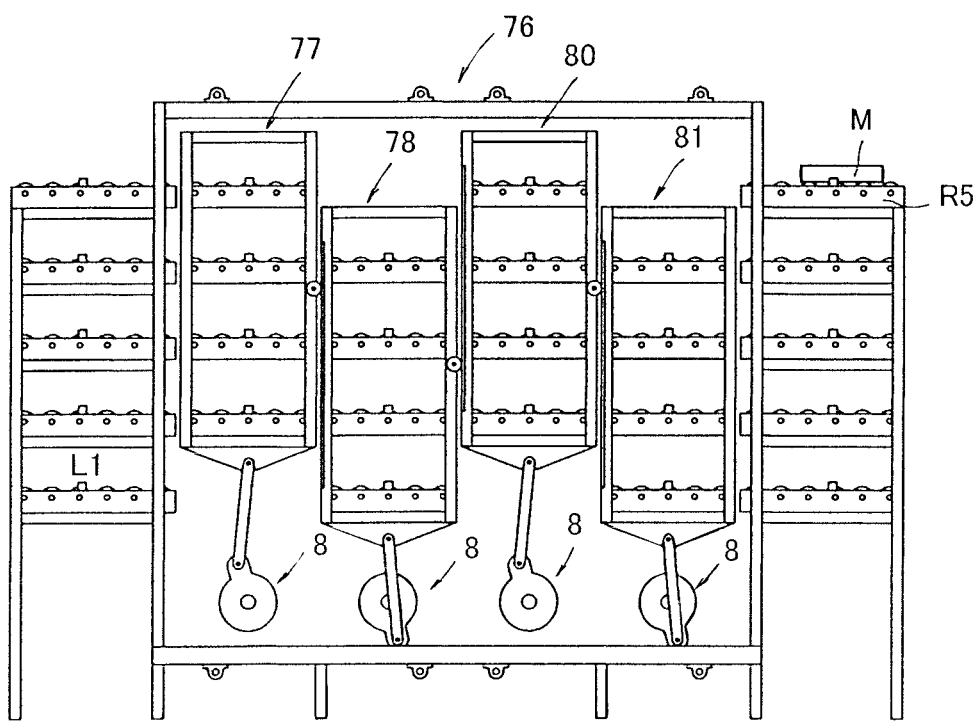

Specifically, as illustrated in FIGS. 16 to 18, the object M placed on a placing table is transferred to a placing table which belongs to the adjacent shelf member and which is positioned on a different height, by lifting and lowering the shelf members to adjust the placing table having the object M placed thereon to be on the same height as the placing table of the adjacent shelf member. This process is sequentially repeated to transfer the object at a location on a desired height.

Figure 19:
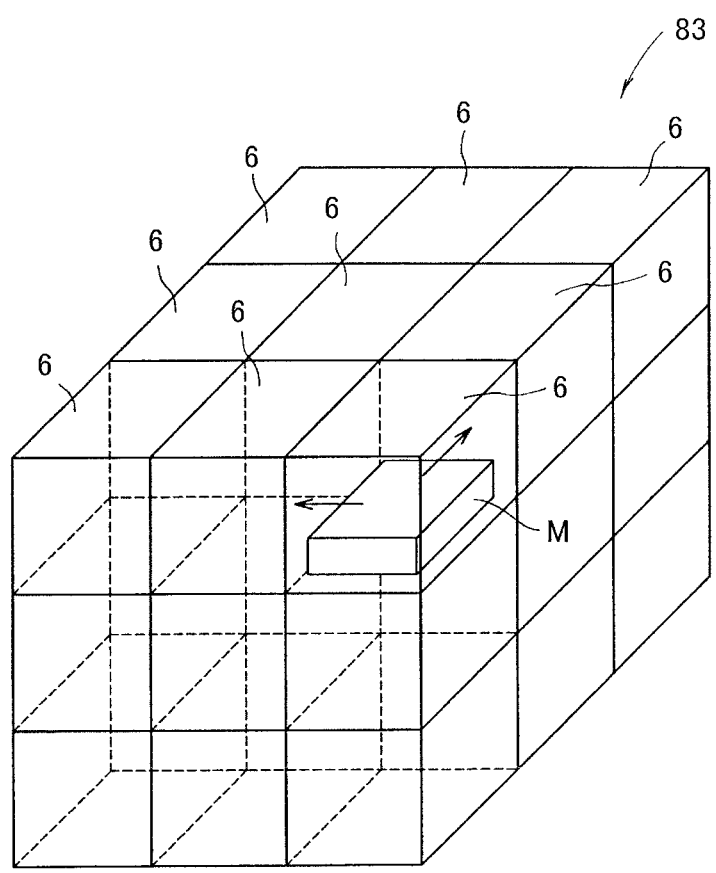
FIG. 19 is a perspective view of a lifting and lowering apparatus according to another embodiment of the present invention.

Further, a configuration as in a lifting and lowering apparatus 83 illustrated in FIG. 19 is considered. In this configuration, a plurality of shelf members 6 are three-dimensionally combined to one another.

Figure 20:
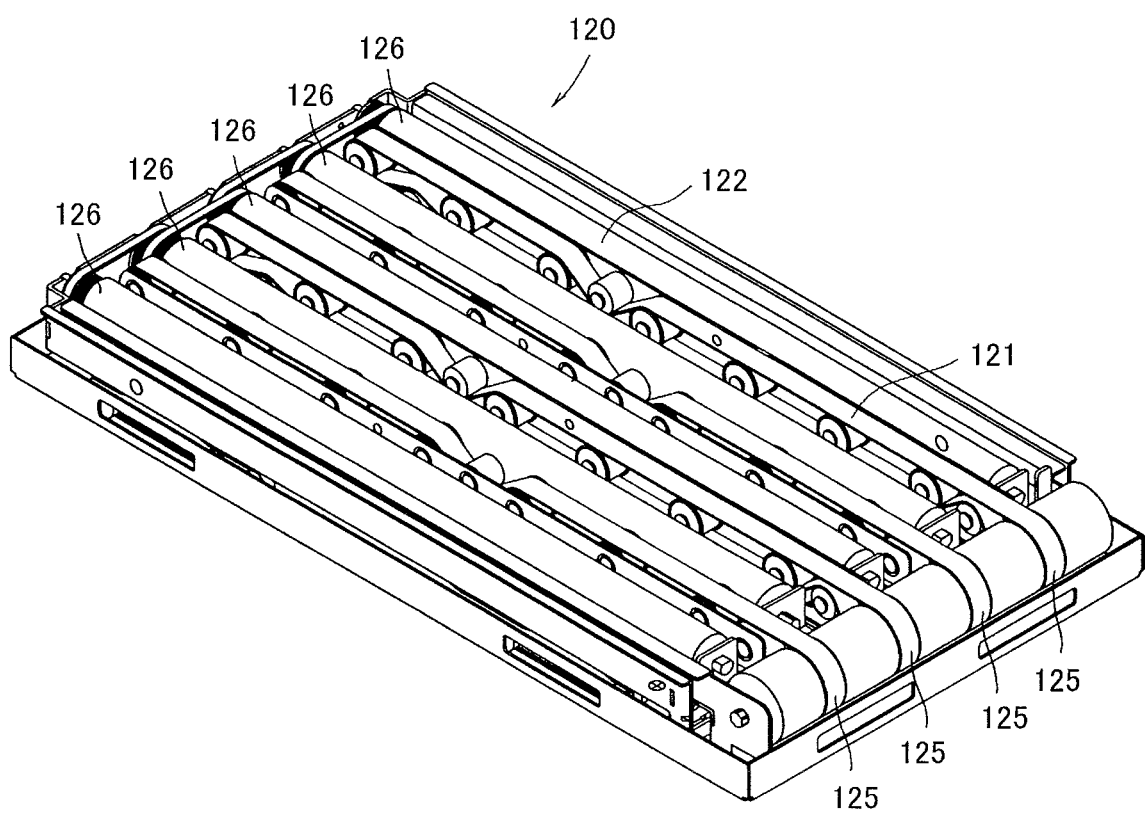
FIG. 20 is a perspective view of a conveyance device used in the lifting and lowering apparatus illustrated in FIG. 19.

The lifting and lowering apparatus 83 illustrated in FIG. 19 employs, as a conveying unit 120, a structure capable of selectively conveying the object M in a vertical direction and a horizontal direction as illustrated in FIG. 20.

Specifically, the conveying unit 120 has a direction changing mechanism for changing a conveyance direction.

As illustrated in FIG. 20, the conveying unit 120 includes a main conveyance conveyor 121 and a sub-conveyance conveyor 122.

The main conveyance conveyor 121 of the conveying unit 120 is a belt conveyor including a plurality of thin belts 125 arranged at regular intervals.

The sub-conveyance conveyor 122 is a roller conveyor. The sub-conveyance conveyor 122 is disposed such that rollers 126 are located between the belts 125 of the main conveyance conveyor 121 as illustrated in FIG. 20. In the conveying unit 120, the main conveyance conveyor 121 and the sub-conveyance conveyor 122 are lifted and lowered such that one of them protrudes upward from the other.

For example, to discharge the object M placed on the conveying unit 120 in the transverse direction with respect to the input direction, the object M is drawn with the main conveyance conveyor 121 being lifted, and then, the sub-conveyance conveyor 122 is lifted and the main conveyance conveyor 121 is lowered so that the sub-conveyance conveyor 122 protrudes upward from the main conveyance conveyor 121. Then, the sub-conveyance conveyor 122 is driven. Thus, the object M is discharged in the direction orthogonal to the initial conveyance direction.

In the lifting and lowering apparatus 83 illustrated in FIG. 19, the plurality of shelf members 6 can be independently lifted and lowered. The lifting and lowering apparatus 83 can change the position of the object M in the height direction by moving the object M to the vertically arranged shelf members 6 as in the lifting and lowering apparatuses 1 and 70 as previously described, and further, can deliver the object M to and from the horizontally adjacent shelf members 6. Accordingly, the object M can be transferred also in the horizontal direction. In addition, the object M can be transferred in the horizontal direction with the position of the object M in the height direction being changed.

In the embodiments described above, the shelf members 6 and 7 of the lifting and lowering apparatuses 1, 68, 70, and 75 and the shelf members 77, 78, 80, and 81 of the lifting and lowering apparatus 76 have the same shape and the same structure, and the intervals between the placing tables A and between the placing tables B are the same at the respective floors. This configuration is recommendable, but the intervals between the placing tables A and between the placing tables B of the shelf members are not necessarily the same.

For example, when the lifting and lowering apparatus 68 illustrated in FIG. 11 is used in which the shelf members 6 and 7 can be lifted and lowered to have any height, the placing tables A and B can be adjusted be on the same height even if the intervals between the placing tables A and between the placing tables B of the adjacent shelf members 6 and 7 are different from each other.

In the example described with reference to FIGS. 5, 6, 7, and 10, the object M is input into the lifting and lowering apparatus 1 from the left station device 3, and discharged to the right station device 5 with the position of the object M in the height direction being changed. In the example described with reference to FIG. 9, the object M is input from both the left station device 3 and the right station device 5, and discharged to the opposite right station device 5 and left station device 3 with the position of the object M in the height direction being changed. However, the object can be input into the lifting and lowering apparatus from any direction and can be discharged from the lifting and lowering apparatus in any direction. For example, the object M may be input into the lifting and lowering apparatus 1 from the left station device 3, and discharged to the left station device 3 with the position of the object M in the height direction being changed.

In addition, the lifting and lowering apparatus 1 may have a step for inputting the object M into the lifting and lowering apparatus 1 from the station device 3 and discharging the object M to the other station device 5 with the position in the height direction being unchanged.

Further, the object M may be input into the shelf member 6 (7) from the station device 3 (5) in a certain area, and at the same time, the object M may be discharged from the shelf member 6 (7) to the station device 3 (5) in another area.

The lifting and lowering apparatuses 1, 68, 70, and 75 described in the above embodiments have been developed to be used for transferring an input object to a location on a height different from the height of the input location by lifting or lowering the object and discharging the object to the outside. However, the lifting and lowering apparatuses may also be used for replacing objects. When the lifting and lowering apparatuses are used for replacing objects, the input object may be discharged with the position in the height direction being unchanged.

For example, if objects MA are on the respective floors of the left station device 3 and objects MB are on the floor of the right station device 5, the objects MA can be moved to the right station device 5 and the objects MB can be moved to the left station device 3.

In addition, objects M can be moved and rearranged according to type. For example, it is supposed that, in FIG. 4, objects MB are on the stations L2 and L3 of the left station device 3 and the conveyance lines C2 and C3 connected to the stations L2 and L3, and objects MA are on the stations L4 and L5 and the conveyance lines C4 and C5 connected to the stations L4 and L5. In this case, the objects MA and MB on the left station device 3 are transferred to the right station device 5. During this process, the objects MA on the left station device 3 are transferred to the stations R2 and R3 of the right station device 5, and the objects MB on the left station device 3 are transferred to the stations R4 and R5 of the right station device 5.

In the embodiments described above, the compact roller conveyors are used for the conveying unit. However, other structured conveyor devices may be used for the conveying units, such as belt conveyors or chain conveyors.

What is claimed is:

1. A lifting and lowering apparatus comprising:
   a first shelf member;
   a second shelf member disposed adjacent to the first shelf member; and
   a lifting and lowering mechanism that lifts and lowers at least one of the first and the second shelf members,
   the first shelf member including a plurality of first placing tables with at least two of the first placing tables at different heights in relationship to each other,
   the second shelf member including a plurality of second placing tables with at least two of the second placing tables at different heights in relationship to each other,
   each of the first and the second shelf members including a conveying unit that conveys an object in both a normal direction and a reverse direction,
   the plurality of first placing tables and the plurality of second placing tables relatively situated to allow conveyance of objects directly between the first placing tables and the second placing tables,
   wherein the lifting and lowering apparatus is capable of executing an outbound operation that adjusts a height of one of the first placing tables to a height of one of the second placing tables to transfer the object from the one of the first placing tables directly to the one of the second placing tables by the conveying unit,
   wherein the lifting and lowering apparatus is further capable of executing a return operation that lifts or lowers the first or the second shelf member to adjust a height of the one of the second placing tables to a height of another of the first placing tables, thereby transferring the object that the outbound operation has transferred to the one of the second placing tables directly to the another of the first placing tables by the conveying unit, and
   wherein the lifting and lowering apparatus is capable of repeating the outbound and the return operations according to necessity to transfer the object to a desired height.

2. The lifting and lowering apparatus according to claim 1,
   wherein the lifting and lowering mechanism simultaneously lifts and lowers the first and the second shelf members, and
   wherein when the first shelf member is lifted by the lifting and lowering mechanism, the second shelf member is simultaneously lowered, whereas when the first shelf member is lowered, the second shelf member is simultaneously lifted.

3. The lifting and lowering apparatus according to claim 1, wherein the first shelf member and the second shelf member are connected to each other with a connecting unit so as to synchronously lift and lower.

4. The lifting and lowering apparatus according to claim 1, wherein each of the placing tables is provided with a load sensor that detects presence of the object.

5. The lifting and lowering apparatus according to claim 1,
   wherein the lifting and lowering apparatus transfers the object on conditions that
   the object is present on the first placing table and the object is not present on the second placing table having a same absolute height as that of the first placing table and to which the object is to be conveyed, or
   the object is present on the second placing table and the object is not present on the first placing table having a same absolute height as that of the second placing tables and to which the object is to be conveyed.

6. The lifting and lowering apparatus according to claim 1,
   wherein the plurality of the first placing tables are vertically arranged inside the first shelf member such that an interval between the adjacent first placing tables is equal,
   wherein the plurality of the second placing tables are vertically arranged inside the second shelf member such that an interval between the adjacent second placing tables is equal, and
   wherein the lifting and lowering mechanism stops the shelf members after lifting or lowering the shelf members by an amount corresponding to the interval or a half of the interval.

7. The lifting and lowering apparatus according to claim 1, comprising a lifting and lowering unit constituted by combining the first and the second shelf members,
   wherein at least one delivery space is provided at each side of the lifting and lowering unit.

8. The lifting and lowering apparatus according to claim 1, comprising a station device having stations positioned at different heights,
wherein the station device is disposed at a position adjacent to the first or the second shelf member, and
wherein the object is delivered between the station and the first or the second placing table.

9. The lifting and lowering apparatus according to claim 1, comprising a station device having stations positioned on different heights,
wherein an interval between the adjacent stations of the station device is substantially equal to an interval between the adjacent first placing tables or the adjacent second placing tables, and
wherein the first or the second shelf member is lifted and lowered by the lifting and lowering mechanism by an amount corresponding to a height or a half height of the interval between the adjacent stations.

10. A lifting and lowering apparatus comprising:
a first shelf member;
a second shelf member disposed adjacent to the first shelf member; and
a lifting and lowering mechanism that lifts and lowers at least one of the first and the second shelf members,
the first shelf member including a plurality of first placing tables with at least two of the first placing tables at different heights in relationship to each other,
the second shelf member including a plurality of second placing tables with at least two of the second placing tables at different heights in relationship to each other, and
each of the first and the second shelf members including a conveying unit that conveys an object in both a normal direction and a reverse direction,
the plurality of first placing tables and the plurality of second placing tables relatively situated to allow conveyance of objects directly between the first placing tables and the second placing tables,
wherein the lifting and lowering apparatus is capable of adjusting a height of one of the first placing tables to a height of one of the second placing tables to transfer and place the object from the one of the first placing tables directly to the one of the second placing tables by the conveying unit,
wherein the lifting and lowering apparatus is further capable of lifting or lowering the first or the second shelf member to adjust a height of the one of the second placing tables to a height of another of the first placing tables, thereby transferring and placing the object that has been placed on the one of the second placing tables directly to the another of the first placing tables by the conveying unit, and
wherein the lifting and lowering apparatus is capable of repeating transference of the object between the first and the second shelf members according to necessity to transfer the object to a desired height.

11. The lifting and lowering apparatus according to claim 10,
wherein the lifting and lowering mechanism simultaneously lifts and lowers the first and the second shelf members, and
wherein when the first shelf member is lifted by the lifting and lowering mechanism, the second shelf member is simultaneously lowered, whereas when the first shelf member is lowered, the second shelf member is simultaneously lifted.

12. The lifting and lowering apparatus according to claim 10, wherein the first shelf member and the second shelf member are connected to each other with a connecting unit so as to synchronously lift and lower.

13. The lifting and lowering apparatus according to claim 10, wherein each of the placing tables is provided with a load sensor that detects presence of the object.

14. The lifting and lowering apparatus according to claim 10,
wherein the lifting and lowering apparatus transfers the object on conditions that
the object is present on the first placing table and the object is not present on the second placing table having a same absolute height as that of the first placing table and to which the object is to be conveyed, or
the object is present on the second placing table and the object is not present on the first placing table having a same absolute height as that of the second placing tables and to which the object is to be conveyed.

15. The lifting and lowering apparatus according to claim 10,
wherein the plurality of the first placing tables are vertically arranged inside the first shelf member such that an interval between the adjacent first placing tables is equal,
wherein the plurality of the second placing tables are vertically arranged inside the second shelf member such that an interval between the adjacent second placing tables is equal, and
wherein the lifting and lowering mechanism stops the shelf members after lifting or lowering the shelf members by an amount corresponding to the interval or a half of the interval.

16. The lifting and lowering apparatus according to claim 10, comprising a lifting and lowering unit constituted by combining the first and the second shelf members,
wherein at least one delivery space is provided at each side of the lifting and lowering unit.

17. The lifting and lowering apparatus according to claim 10, comprising
a station device having stations positioned at different heights,
wherein the station device is disposed at a position adjacent to the first or the second shelf member, and
wherein the object is delivered between the station and the first or the second placing table.

18. The lifting and lowering apparatus according to claim 10, comprising a station device having stations positioned on different heights,
wherein an interval between the adjacent stations of the station device is substantially equal to an interval between the adjacent first placing tables or the adjacent second placing tables, and
wherein the first or the second shelf member is lifted and lowered by the lifting and lowering mechanism by an amount corresponding to a height or a half height of the interval between the adjacent stations.

19. A method for lifting and lowering an object, the method comprising:
providing a first station and a second station that are positioned at different heights in relationship to each other;
providing a first shelf member and a second shelf member that is disposed adjacent to the first shelf member;
wherein the first shelf member includes a plurality of first placing tables with at least two of the first placing tables at different heights in relationship to each other, whereas the second shelf member includes a plurality of second placing tables with at least two of the second placing tables at different heights in relationship to each other, and wherein the first and the second shelf members lift and lower synchronously, such that when one of the first and the second shelf members lifts, the other lowers, whereas when the other lifts, the one lowers, adjusting a height of one of the first placing tables to a height of the first station to transfer an object placed on the first station to the one of the first placing tables;

changing a height of the first shelf member and a height of the second shelf member simultaneously to adjust a height of the one of the first placing tables to a height of one of the second placing tables;

transferring the object from the one of the first placing tables directly to the one of the second placing tables;

changing a height of the first shelf member and a height of the second shelf member again simultaneously to adjust a height of the one of the second placing tables to a height of another of the first placing tables;

transferring the object from the one of the second placing tables directly to the another of the first placing tables;

repeating transference of the object between the first and the second shelf members according to necessity to transfer the object to a desired height; and discharging the object to the second station.

* * * * *